(12) United States Patent
Holt

(10) Patent No.: US 10,276,997 B1
(45) Date of Patent: Apr. 30, 2019

(54) WIRE ASSEMBLY INCLUDING CLOCKSPRING PASSES

(71) Applicant: Honeywell International Inc., Morris Plains, NJ (US)

(72) Inventor: Keone J. Holt, Duvall, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/726,938

(22) Filed: Oct. 6, 2017

(51) Int. Cl.
| H01R 39/00 | (2006.01) |
| H01R 35/02 | (2006.01) |
| H02G 11/00 | (2006.01) |
| H01Q 1/27 | (2006.01) |
| B60R 16/027 | (2006.01) |

(52) U.S. Cl.
CPC .......... *H01R 35/025* (2013.01); *H02G 11/00* (2013.01); *B60R 16/027* (2013.01); *H01Q 1/27* (2013.01)

(58) Field of Classification Search
CPC ........ H01R 35/025; H02G 11/00; H01Q 1/27; B60R 16/027
USPC .......................................... 439/15, 164, 534
See application file for complete search history.

(56) References Cited

U.S. PATENT DOCUMENTS

| 5,214,439 | A | 5/1993 | Reed |
| 5,517,204 | A | 5/1996 | Murakoshi et al. |
| 6,531,990 | B2* | 3/2003 | Verkerk .................. H01Q 3/08 343/765 |
| 8,974,234 | B2* | 3/2015 | Takahashi ............ B60R 16/027 439/15 |
| 8,998,628 | B2* | 4/2015 | Hirai ..................... H01R 35/04 439/15 |
| 9,146,369 | B2 | 9/2015 | Kolvek et al. |
| 2016/0380349 | A1 | 12/2016 | Elson |
| 2017/0029139 | A1 | 2/2017 | Anania et al. |
| 2017/0090141 | A1 | 3/2017 | Chin et al. |

OTHER PUBLICATIONS

Extended Search Report from counterpart European Application No. 18198521.9, dated Feb. 25, 2019, 9 pp.

* cited by examiner

*Primary Examiner* — Khiem M Nguyen
(74) *Attorney, Agent, or Firm* — Shumaker & Sieffert, P.A.

(57) ABSTRACT

In some examples, electrical wires are routed between a base and a rotating component through a plurality of clockspring passes. The wires can be, for example, ribbon wires or another type of wire. Each wire of the plurality of wires is coiled around a structure of a clockspring pass of the plurality of clockspring passes, and is configured to tighten or loosen around the structure as the component rotates relative to the base about at least one axis.

20 Claims, 10 Drawing Sheets

WIRE ASSEMBLY INCLUDING CLOCKSPRING PASSES

TECHNICAL FIELD

The present disclosure relates to a cross gimbal wire assembly, which can be used, for example, in a radar system.

BACKGROUND

Sensors, such as a radar sensor onboard an aircraft, marine vessel, or other vehicle, or at a ground station, may be used to detect objects, track objects, generate weather information, and/or aid in navigation of a vehicle. Such sensors may be mounted to a gimbal assembly in order to allow multi-axis movement of the sensor relative to a base or another stationary component including electrical components.

SUMMARY

This disclosure describes example devices, systems, and techniques for electrically connecting a component (e.g., a sensor such as a radar sensor) to electronics in a base or other stationary component, the component being movable relative to the base about at least one axis. For example, the component may be mounted to the base via a gimbal assembly configured to enable multi-axis movement of the component relative to a base. A plurality of wires, such as ribbon wires each including a plurality of individual wires, electrically connect electrical circuitry of the component to the base electronics. The wires are routed between the base and the component through a plurality of clockspring passes. Each wire of the plurality of wires is coiled around a structure of a clockspring pass of the plurality of clockspring passes, and the ribbon wire is configured to tighten or loosen around the structure as the component rotates relative to the base about at least one axis. Routing the wires through the clockspring passes may help reduce stress on the wires as the component moves relative to the base due to the controlled and manner in which the wires move within the clockspring passes. Further, stacking a plurality of clockspring passes, rather than routing all the wires through a single clockspring pass, may enable the routing to occupy a smaller footprint.

In some examples, a plurality of ribbon wires defines a first stack of ribbon wires prior to be routed through the plurality of clockspring passes. The ribbon wires may be held in the first stack using any suitable technique, such as, but not limited to, a mechanical mechanism (or an adhesive. The stack of ribbon wires may then be split into a plurality of sub-stacks, each sub-stack having a smaller number of ribbon wires than the stack of wires. Each of these sub-stacks may be routed through a respective clockspring pass. After being routed through the respective clockspring passes, the sub-stacks of ribbon wires may then be combined again to define a second stack of ribbon wires. The ribbon wires may be held in the second stack using any suitable technique. The first and second stack of ribbon wires may include the same number of ribbon wires in some examples.

Clause 1: In one example, a system includes a base including base electronics, a component including circuitry, and a gimbal assembly mechanically connecting the component to the base. The gimbal assembly is configured to permit the component to rotate relative to the base. The system further includes a plurality of ribbon wires electrically connecting the base electronics to the component, and a plurality of clockspring passes between the base and the component, where each ribbon wire of the plurality of ribbon wires is routed between the base and the component through a clockspring pass of the plurality of clockspring passes. Each ribbon wire of the plurality of ribbon wires is coiled around a structure of a clockspring pass of the plurality of clockspring passes, where the ribbon wire is configured to tighten or loosen around the structure as the component rotates relative to the base.

Clause 2: In some examples of the system of clause 1, a length of each ribbon wire of the plurality of ribbon wires within the respective clockspring pass of the plurality of clockspring passes does not change as the component rotates relative to the base.

Clause 3: In some examples of the system of clause 1 or 2, the component has an initial rotational position relative to the base, where portions of the ribbon wires within the clockspring passes define loops having an initial transverse dimension when the component is in the initial rotational position. In these examples, when the component rotates away from the initial rotational position in a first direction, the ribbon wires define loops having a smaller transverse dimension than the initial transverse dimension, and when the component rotates away from the initial rotational position in a second direction opposite the first direction, the ribbon wires define loops having a larger transverse dimension than the initial transverse dimension.

Clause 4: In some examples of the system of any of clauses 1 to 3, at least two ribbon wires of the plurality of ribbon wires are routed through the same clockspring pass of the plurality of clockspring passes.

Clause 5: In some examples of the system of clause 4, the plurality of ribbon wires forms a first stack of ribbon wires and at least two ribbon wires of the plurality of ribbon wires routed through a same clockspring pass of the plurality of clockspring passes form a second stack having a fewer number of ribbon wires than the first stack. The first stack splits into at least the second stack and a third stack including one or more ribbon wires of the plurality of ribbon wires. In addition, at least the second stack and the third stack are each routed through a respective clockspring pass of the plurality of clockspring passes. After being routed through the respective clockspring passes, at least the second stack and the third stack are re-stacked to form a fourth stack of ribbon wires.

Clause 6: In some examples of the system of any of clauses 1 to 5, the plurality of clockspring passes includes a first plurality of clockspring passes, and the gimbal assembly is configured to permit the component to rotate relative to the base about a first axis and a second axis. The first plurality of clockspring passes are configured to permit the ribbon wires to tighten or loosen around the structure as the component rotates relative to the base about the first axis. The system further includes a pendulum member or a second plurality of clockspring passes, where at least one ribbon wire of the plurality of ribbon wires is routed between the base and the component through the pendulum member or through the second plurality of clockspring passes. The pendulum member is configured to rotate about the second axis. In examples in which at least one ribbon wire of the plurality of ribbon wires is routed between the base and the component through the second plurality of clockspring passes, the at least one ribbon wire is coiled around a structure of a clockspring pass of the second plurality of clockspring passes, where the at least one ribbon wire is configured to tighten or loosen around the structure of the clockspring pass of the second plurality of clockspring passes as the component rotates relative to the base about the second axis.

Clause 7: In some examples of the system of clause 6, the gimbal assembly is further configured to permit the component to rotate relative to the base about a third axis. In these examples, the system further includes a third plurality of clockspring passes, where at least one ribbon wire of the plurality of ribbon wires are routed between the base and the component through the third plurality of clockspring passes Clause 8: In some examples of the system of any of clauses 1 to 7, the plurality of clockspring passes are stacked together.

Clause 9: In some examples of the system of any of clauses 1 to 8, the component includes a radar including an antenna element.

Clause 10: In some examples, a method includes wrapping a first ribbon wire of a plurality of ribbon wires around a first structure of a first clockspring pass of a plurality of clockspring passes and wrapping a second ribbon wire of the plurality of ribbon wires around a second structure of a second clockspring pass of the plurality of clockspring passes. The method further includes electrically connecting the plurality of ribbon wires to base electronics of a base and electrically connecting the plurality of ribbon wires to a component including an antenna element, where the first and second ribbon wires are configured to tighten or loosen around the first structure or the second structure, respectively, as the component rotates relative to the base.

Clause 11: In some examples of the method of clause 10, the method further includes mechanically connecting the component to the base, where mechanically connecting the component to the base includes mechanically connecting a gimbal assembly to the component and to the base. The gimbal assembly is configured to permit the component to rotate relative to the base.

Clause 12: In some examples of the method of clause 10 or 11, the plurality of clockspring passes includes a first plurality of clockspring passes, and the component is configured to rotate relative to the base about a first axis and a second axis. The first plurality of clockspring passes is configured to permit the first and second ribbon wires to tighten or loosen around the first structure or the second structure, respectively, as the component rotates relative to the base about the first axis. The method further includes routing the first ribbon wire between the base and the component through a pendulum member or wrapping the first ribbon wire around a third structure of a third clockspring pass of a second plurality of clockspring passes. The pendulum member is configured to rotate about the second axis. In examples in which the method includes wrapping the first ribbon wire around a third structure of a third clockspring pass of a second plurality of clockspring passes, the first ribbon wire is configured to tighten or loosen around the third structure of the third clockspring pass as the component rotates relative to the base about the second axis.

Clause 13: In some examples of the method of clause 12, the gimbal assembly is further configured to permit the component to rotate relative to the base about a third axis. In these examples, the method further includes wrapping the first ribbon wire around a fourth structure of a fourth clockspring pass of a third plurality of clockspring passes, where the first ribbon wire is configured to tighten or loosen around the fourth structure of the fourth clockspring pass as the component rotates relative to the base about the third axis.

Clause 14: In some examples of the method of any of the clauses 10 to 13, the method further includes wrapping a third ribbon wire of the plurality of ribbon wires around the first structure of the first clockspring pass.

Clause 15: In some examples of the method of clause 14, wrapping the first ribbon wire and a third ribbon wire around the first structure includes stacking the first and third ribbon wires and wrapping the stacked first and third ribbon wires around the first structure of the first clockspring pass.

Clause 16: In some examples of the method of clause 14, the method further includes forming a first stack of ribbon wires including the plurality of ribbon wires and splitting the first stack into at least a second stack and a third stack. The second and third stacks each include a fewer number of ribbon wires than the first stack. The second stack includes at least the first ribbon wire and a third ribbon wire, and the third stack includes at least the second ribbon wire. In addition, the method includes wrapping the second stack around the first structure of the first clockspring pass and wrapping the third stack around the second structure of the second clockspring pass. After wrapping the second and third stacks around the first and second structures, respectively, the method also includes re-stacking the second and third stacks of ribbon wires to define a fourth stack of ribbon wires.

Clause 17: In some examples, a system includes a base including base electronics, a component including circuitry, and a gimbal assembly. The gimbal assembly mechanically connects the component to the base, and the gimbal assembly is configured to permit the component to rotate relative to the base about an axis, where the component has an initial rotational position relative to the base. The system further includes a plurality of ribbon wires electrically connecting the base electronics to the component and a plurality of clockspring passes between the base and the component. Each ribbon wire of the plurality of ribbon wires defines a coil within a clockspring pass of the plurality of clockspring passes. In these examples, when the component rotates away from the initial rotational position in a first direction, the coils defined by ribbon wires tighten within the respective clockspring pass, and when the component rotates away from the initial rotational position in a second direction different than the first direction, the coils defined by ribbon wires loosen within the respective clockspring pass.

Clause 18: In some examples of the system of clause 17, portions of the ribbon wires within the clockspring passes define loops having an initial transverse dimension when the component is in the initial rotational position. In these examples, when the component rotates away from the initial rotational position in the first direction, the ribbon wires define loops having a smaller transverse dimension than the initial transverse dimension, and wherein when the component rotates away from the initial rotational position in the second direction, the ribbon wires define loops having a larger transverse dimension than the initial transverse dimension.

Clause 19: In some examples of the system of clause 17 or 18, at least two ribbon wires of the plurality of ribbon wires are routed through the same clockspring pass of the plurality of clockspring passes.

Clause 20: In some examples of the system of any of clauses 17 to 19, the component includes a radar including a plurality of antenna elements.

The details of one or more aspects of the disclosure are set forth in the accompanying drawings and the description below. Other features, objects, and advantages of the devices, systems, and techniques described in this disclosure will be apparent from the description and drawings, and from the claims.

DETAILED DESCRIPTION

Figure 1:
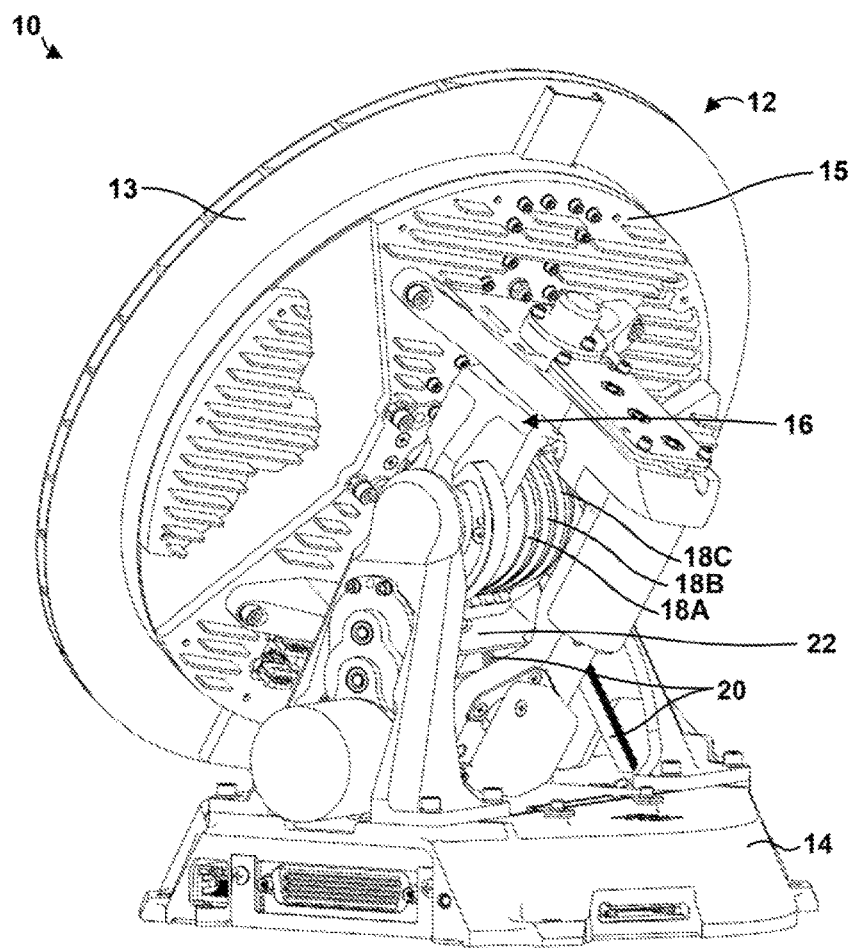
FIG. 1 is a conceptual and schematic diagram illustrating an example radar system including a radar, a base, a gimbal assembly, and a plurality of clockspring passes.

The disclosure describes example devices, systems, and techniques for electrically connecting a component to electronics in a base or other stationary component, the component being movable relative to the base about at least one axis. The component can be, for example, a sensor including circuitry, such as a radar, or other component including circuitry that is electrically connected to the base or other stationary component via a plurality of wires. In some examples, a component may be mechanically connected to a base or other stationary component (hereinafter, "base") via a gimbal assembly. The gimbal assembly is configured to enable the component to move relative to the base about one or more axes. As an example, the component may be a radar, and may be able to move about two or more axes (e.g., two axes or three axes) in order to transmit and receive electromagnetic waves in multiple directions. In some examples, movement about multiple axes may allow the component to scan along a wider range of vision than a component moving about a single axis, and therefore may allow more information to be obtained by the component.

Although the disclosure primarily refers to the movable component as a radar, in other examples, the example devices, systems, and techniques for routing wiring between a component and a base may be used with other types of sensors or other types of devices that include wires routed between a component that rotates relative to another component. For example, the example devices, systems, techniques as described herein could also be used with gyroscopes, thermal imaging cameras, satellite tracking antennas, robotic applications, camera systems including a gimbal assembly, weapon systems including a gimbal assembly, or the like. Thus, in some examples, the component can include, for example, a gyroscope, a camera, a robotic component, a weapon system, and the like.

In order to electrically connect the radar to the base, one or more wires are routed through, around, and/or near the gimbal assembly. In some cases, a "flying cable" wiring approach may be used in which the wires may electrically connect the radar to the base without any additional housing, apparatus, or assembly configured to house and/or protect the wires. For example, the wires may electrically connect the base and the radar without an assembly or apparatus that controls movement of the wires as the radar rotates relative to the base. In turn, the multi-axis movement of the radar relative to the base may cause the wires to twist, bend, turn, or otherwise move as the radar moves. In some examples, the repetitive twisting, bending, turning, or moving of the wires may shorten the useful life of the wires.

In examples described herein, wires are routed between a component and a base via a plurality of clockspring passes. The wires may be coiled (e.g., wrapped to define a coil or other similar geometrical configuration) around a structure of a clockspring pass to define a clockspring, which allows the coil defined by the wires to tighten (e.g., contraction of a coil defined by the wires) and loosen (e.g., expansion of the coil defined by the wires) around the structure as the radar (or other component) rotates relative to the base. The clockspring passes can, for example, move with the radar as the radar rotates. Regardless of whether the one or more coils defined by the wires are tightening or loosening, the wires remain in a coiled configuration during movement of the radar relative to the base, rather than twisting, bending, turning, or the like.

In some examples, a length of each wire within the particular clockspring pass of the plurality of clockspring passes does not change as the radar rotates relative to the base. Instead, the coil geometry changes as a result of the rotation of the radar relative to the base. For example, a ribbon wire may define a coil having an initial number of turns (e.g., 2.5 turns), and the number of turns may increase as the radar rotates relative to the base in a first direction, and the number of turns may decrease as the radar rotates relative to the base in a second direction different than (e.g., opposite to) the first direction.

When the radar is in an initial rotational position (e.g., a position corresponding to 0 degrees (°) of rotation relative to a reference point), the wires may define an initial coiled state. In the initial coiled state, the wires may, for example, each define loops (of a coil) having an initial transverse dimension (e.g., an initial diameter). The transverse dimension of the loops may be an inner diameter or another dimension, as the loops may not be circular in cross-section in all examples. For example, the transverse dimension may be the greatest length of a straight line extending from an inner surface of a cross-section of the loop to an opposite inner surface (e.g., diametrically opposed in the case of a loop having a circular cross-section) of the cross-section of the loop.

As the radar rotates (relative to the base) about a first axis in a first direction away from the initial rotational position, the wires may tighten around the clockspring pass structure and form tighter coils (e.g., defining relatively small diameter loops around the structure than when in the initial coiled state. As the radar rotates (relative to the base) back towards the initial position, the wires may define a looser coil, e.g., toward the initial coiled state, around the structure of the clockspring pass. As the radar rotates about the first axis in a second direction away from the initial rotational position relative to the base, the wires may loosen around the clockspring pass structure and form looser coils (e.g., defining relatively large diameter loops around the structure) than when in the initial coiled state. As the radar rotates (relative to the base) back towards the initial position, the wires may define a tighter coil, e.g., toward the initial coiled state, around the structure of the clockspring pass. The tightening and loosening of the coils defined by the wires around the structure of the clockspring pass may allow for the radar to rotate relative to the base in multiple directions without the wires twisting, bending, turning, or the like. The stiffness of the wires enables the wires to tighten or loosen around a clockspring pass structure in this manner.

The wires routed through the plurality of clockspring passes may define a larger bend radius than some wires of other assemblies in which the wires are not routed through a plurality of clockspring passes, such as assemblies in which the wires are routed using the "flying cable" wiring approach. In other words, the plurality of clockspring passes may help prevent the wires from bending in a more extreme manner, e.g., at a sharper bend radius, at least due to the minimum radius of curvature of the wires defined by the clockspring pass structure around which the one or more wires are wound.

A bend radius is measured to an inside curvature of a wire or other structure, such as a bent pipe, tube, sheet, cable, or hose. As used herein, "bend radius" describes the minimum radius a wire, pipe, tube, sheet, cable, or hose can be bent without kinking it, adversely affecting the integrity of it, and/or shortening its useful life. Regardless of the bend radius of the component, a sharper bend radius experienced by a given component (having a given structure) may decrease the useful life of the component in comparison to the same given component experiencing a less sharp bend radius. Smaller bend radii may be sharper than larger bend radii. For example, a bend radius of 1 millimeter (mm) may be sharper than a bend radius of 10 mm. Due to the more controlled movement of the wires resulting from the clockspring passes described herein, for a given radar system, the useful life of the wires may be increased as a result of lower stresses on the wires and larger bend radii experienced during normal movement of the radar system.

The use of a plurality of clockspring passes to route wires between a radar and a base may also allow the radar system to be relatively compact, such as, for example, to fit in the nose of a relatively small aircraft. In some examples, the use of a single clockspring pass may not be feasible for use in relatively compact applications. For example, some radar systems may include a large number of electrical connections to electrically connect the base to the radar, such as greater than thirty electrical connections. In examples in which there are a large number of electrical connections between the radar and the base, a system including a single clockspring pass may need to be larger than some systems including a plurality of clockspring passes in order to accommodate the many wires forming the electrical connections between the base and the radar. In contrast, a plurality of clockspring passes may enable the wires to be arranged, stacked, and/or distributed through the plurality of clockspring passes in a more compact manner than some single clockspring passes may enable.

FIG. 1 is a conceptual and schematic diagram illustrating an example radar system 10 including a radar 12, a base 14, a gimbal assembly 16, and a plurality of clockspring passes 18A-18C (collectively referred to as, "clockspring passes 18"). A plurality of wires 20 electrically connect electronics of base 14 to electronics of radar 12. In the example shown in FIG. 1, radar 12 includes antenna 13 and a radio frequency (RF) module 15. Antenna 13 may include one or more antenna elements (e.g., a single antenna element or a plurality of antenna elements) configured to transmit and receive radio waves. RF module 15 may include electrical circuitry configured to generate RF signals, and may send and receive RF signals via antenna 13. In this way, radar 12 may function as both a transmitter and a receiver. In other examples, some or all of the signal generation functionality of radar 12 may be included within base 14 and electrically coupled to antenna 13.

Base 14 includes base electronics (not shown in FIG. 1). The base electronics may include electrical components (e.g., electrical circuitry) that enable operation of radar 12 to transmit and/or receive radar signals via antenna 13 of radar 12. For example, the base electronics may include one or more of: a power unit, a display processor, processing circuitry, memory, communications circuitry, or the like.

Gimbal assembly 16 mechanically connects base 14 and radar 12 and is configured to permit radar 12 to rotate relative to base 14. In some examples, gimbal assembly 16 is configured to enable radar 12 to rotate about multiple axes. For example, radar 12 may rotate about a first and a second axis, e.g., about the x-axis and y-axis shown in FIG. 1 (orthogonal x-y-z axes are shown in the figures for ease of description only), relative to base 14. In some examples, gimbal assembly 16 is configured to enable radar 12 to rotate about the x-axis in a range of about 120 degrees to about 180 degrees, such as about 160 degrees. For example, radar 12 may be configured to rotate relative to base 14 about the x-axis+/−90 degrees relative to an initial (rotational) position of radar 12 relative to base 14. In some examples, gimbal assembly 16 is configured to enable radar 12 to rotate in the about the y-axis in a range of about 60 degrees to about 70 degrees, e.g., +/−35 degrees relative to an initial (rotational) position of radar 12 relative to base 14. However, other ranges of motion may also be used in other examples.

In some examples, rotation of radar 12 relative to base 14 about the first axis, e.g., about the x-axis, may allow radar 12 to rotate relative to base 14 in an azimuth direction, and rotation of radar 12 relative to base 14 about the second axis, e.g., about the y-axis, may allow radar 12 to rotate relative to base 14 in an elevation direction. In some examples, gimbal assembly 16 is configured to allow radar 12 to rotate about both the x-axis and the y-axis simultaneously. In addition, in some examples, gimbal assembly 16 may additionally allow radar 12 to rotate relative to base 14 about a third axis, e.g., about the z-axis. In some such examples, rotation of radar 12 relative to base 14 about the third axis may allow radar 12 to rotate relative to base 14 in a roll direction.

A plurality of wires 20 are routed from base 14 to radar 12 to electrically connect electrical circuitry of base 14 to radar 12, e.g., electrical circuitry of RF module 15 (generally referred to herein as electrically connecting base 14 to radar 12). In some examples, a large number of individual wires forming respective electrical connections, such as, for example, greater than ten, twenty, or even thirty wires, may be used to electrically connect base 14 to radar 12. The large number of wires may be routed through, near, and/or around gimbal assembly 16 to electrically connect base 14 to radar 12. Depending on the location and/or size of radar system 10, radar system 10 and, therefore, gimbal assembly 16 may be relatively small. In turn, the space through, near, and/or around gimbal assembly 16 may be crowded in examples in which a large number of wires are present. In some examples, a crowded space through, near, and/or around gimbal assembly 16 may impede the normal movement of radar system 10. Additionally, or alternatively, the crowded space may shorten the useful life of the wires, for example, due to friction of the wires rubbing against each other and/or another component, limited space for the wires to move in a controlled manner, compression of the wires, smaller bend radii of wires to navigate the wires between radar 12 and base 14, or the like.

Regardless of the axis of rotation in which radar 12 rotates relative to base 14, the distance between radar 12 and base 14 (e.g., between the antenna elements of radar 12 and the base electronics of base 14). Therefore, the distance between each end of a respective wire 20 electrically connecting base 14 to radar 12, may not change, but rather radar 12 may change a circumferential position relative to base 14. Because of the change in circumferential position of radar 12 relative to base, a geometrical configuration of the wires electrically connecting radar 12 to base 14 may also need to change to accommodate for the different circumferential position so that the wires are not pulled, strained, or like.

To help address these issues, radar system 10 includes a plurality of clockspring passes 18, through which wires 20 from radar 12 to base are routed in order to electrically connect the base electronics to radar 12 via wires 20. Routing wires 20 from radar 12 to base 14 through plurality of clockspring passes 18 allows the wires to be routed in a controlled manner and that can control a geometrical configuration of wires 20 to accommodate for different circumferential positions of radar 12 relative to base 14, while still enabling radar system 10 and gimbal assembly 16 to be relatively compact. Routing wires 20 from base 14 to radar 12 through the plurality of clockspring passes 18 may reduce or even prevent repetitive twisting, undesirable bending (e.g., undesirable bend radii), turning, rubbing of the wires, or undesirable movement of the wires during rotation of radar 12 relative to base 14, regardless of the number of wires. Further, plurality of clockspring passes 18 enable a large number of wires to be routed in an organized fashion between radar 12 to base 14 (and electrically connected to radar 12 and base 14) within a relatively small volume of space, and remain organized even during operation of radar system 10. In this way, plurality of clockspring passes 18 may be useful for routing wires through a relatively compact space.

In some examples, each clockspring pass 18A-18C defines a channel configured to receive one or more of the wires 20. The one or more wires are configured to be spirally wound, e.g., coiled, within the channel of the particular clockspring pass 18A, 18B, or 18C. For example, each wire may be coiled within the channel so that the channel includes one or more layers of a particular wire, and may define an initial coil configuration within the channel when radar 12 is in an initial rotational position relative to base 14. The wires tighten or loosen within the clockspring pass 18A, 18B, or 18C (around a clockspring pass structure) as radar 12 rotates about an axis, e.g., the x-axis of FIG. 1, relative to base 14 and away from the initial rotational position. For example, the wires may tighten around the particular clockspring pass 18A, 18B, or 18C as radar 12 rotates relative to base 14 about the x-axis in a first direction to form a tighter coil relative to the initial coil configuration, and the wires may loosen around the particular clockspring pass 18A, 18B, or 18C as radar 12 rotates relative to base 14 about the x-axis in a second direction opposite the first direction.

In some examples, "tighten" describes the wires forming a tighter coil around a structure (e.g., an internal structure, as described below) of clockspring pass, and "loosen" describes the wires forming a looser coil around the clockspring pass structure. When a wire (or stack of wires) defines a tighter coil within a clockspring structure, the wire or wires may define more convolutions (e.g., turns) than when in the initial coil configuration. In addition, when a wire (or stack of wires) defines a looser coil within a clockspring structure, the wire or wires may define fewer convolutions (e.g., turns) than when in the initial coil configuration.

In some examples, an initial rotational position of radar 12 relative to base 14 (a 0 degree position), a particular wire 20 or stack of wires 20 may be a neutral position within clockspring pass 18A, 18B, or 18C, in which the wire 20 or stack of wires 20 defines an initial coil configuration. This initial coil configuration may be referred to as the resting state of the Wire 20 or stack of wires 20. In this initial coil configuration, the wire 20 or stack of wires 20 within a particular clockspring pass 18A, 18B, or 18C may define a first number of convolutions (e.g., 2 to 5 turns, such as about 2.5 turns). As radar 12 rotates relative to base 14 about the x-axis, a plurality of clockspring passes 18 may also rotate relative to base 14 and the wire 20 or stack of wires 20 within each clockspring pass 18A-18C may tighten or loosen around the structure of the respective clockspring pass 18A, 18B, or 18C as radar 12 rotates relative to base 14. For example, the wires 20 routed through clockspring passes 18 may be fixed at a first location (e.g., fixed relative to base 14) prior to or upon entering the respective clockspring pass 18A, 18B, or 18C, and may be fixed at a second location (e.g., fixed relative to radar 12) after or upon exiting the respective clockspring pass 18A, 18B, or 18C. The change in relative position of these fixed locations of the wires 20 as radar 12 rotates relative to base 14 causes wires 20 to change geometry within the particular clockspring pass 18A, 18B, or 18C, but may not cause a length of the wires 20 routed through the particular clockspring pass 18A, 18B, or 18C to change in response to rotation of radar 12 relative to base 14. In this way, a wire 20 may form a tighter coil around a structure of a clockspring pass 18A, 18B, or 18C as radar 12 rotates relative to base 14 in a first direction about the x-axis, and the wire 20 may form a looser coil around clockspring pass 18A, 18B, or 18C as radar 12 rotates relative to base 14 in a second direction about the x-axis.

In some examples, when radar 12 has rotated to its fullest extent in the first direction, wires 20 define an additional 0.25 to 1 turn around the clockspring structure, such as an additional 0.25 to 0.5 turns or an additional about 0.33 turns relative to the initial coil configuration. In addition, in some examples, when radar 12 has rotated to its fullest extent in the second direction, the wires 20 define 0.25 to 1 fewer turns around the clockspring structure, such as about 0.25 to about 0.5 fewer turns, or about 0.33 fewer turns, relative to the initial coil configuration. The stiffness of wires 20, as well as the fixation of the wires on both the entrance and exit to the clockspring coils may enable the wires to change geometry within the clockspring pass 18A, 18B, or 18C as radar 12 rotates relative to base 14. The stiffness of wires 20 enables the wires to tighten around the structure of the clockspring pass 18A, 18B, or 18C, and loosen around the structure of the clockspring pass back to the initial coil configuration without significantly bending or kinking.

In other examples, rather than being fixed at a first location and at a second location, wires 20 may not be fixed at the first location, the second location, or both. In some such examples, tightening of wires 20 within a clockspring pass 18A, 18B, or 18C may result in a portion of the wires 20 unwinding and/or exiting from the particular clockspring pass 18A, 18B, or 18C, and loosening may result in a portion of the wires 20 re-winding or entering the particular clockspring pass 18A, 18B, or 18C. In this way, the effective length of the wires 20 may be increased or decreased by the tightening or loosening of the wires, respectively, due to the movement of radar 12 relative to base 14.

In some examples, one or more wires 20 enter a clockspring pass 18A, 18B, or 18C at a position radially inward (e.g., as measured from the radial center of the respective clockspring pass to the outer perimeter of the clockspring pass) to the location in which the one or more wires 20 exit the particular clockspring pass 18A, 18B, or 18C. For example, the one or more wires 20 may enter a clockspring pass 18A, 18B, or 18C at a radially inward location and may be spirally wound, e.g., coiled, one or more times around the clockspring pass to reach the position in which the one or more wires 20 exit the clockspring pass. In other examples, the one or more wires 20 may exit the clockspring pass 18A, 18B, or 18C at a position radially inward to the location in which the one or more wires 20 enter the clockspring pass.

In some examples, the amount of times each wire 20 is spirally wound around one of the clockspring passes 18A, 18B, or 18C is based on a range of rotation of the clockspring pass 18A-18C due to rotation of radar 12 relative to base 14 about the x-axis. For example, the amount of times each wire 20 is spirally wound around one of the clockspring passes 18A, 18B, or 18C is selected such that a maximum amount of rotation of clockspring passes 18 about the x-axis (or axis) during operation of radar system 10 results in the wires 20 tightening around the respective clockspring pass 18A, 18B, or 18C with little to no strain on the wires. For example, each wire 20 may be spirally wound around a component of a clockspring pass 18A, 18B, or 18C so that when clockspring passes 18 are rotated about the x-axis from an initial rotational position, none of the wires 20 are strained and/or pulled, even though the wires 20 form a relatively tight coil around the respective clockspring pass 18A, 18B, or 18C.

Wires 20 may be coiled around the respective clockspring pass 18A-18C so that none of the wires are fully tightened around the respective when radar 12 is in its initial rotational position, or, in some examples, in any rotational position. In turn, wires 20 may be subject to less stress, e.g., due to wires 20 being pulled or strained, than in examples in which wires 20 are configured to be fully tightened around clockspring pass 18A, 18B, or 18C without any slack or additional length of wire, at some positions of radar 12 relative to base 14.

In some examples, wires 20 electrically connecting electronics of radar 12 to base 14 are ribbon wires. Ribbon wires 20 may include a plurality of wires or other electrical conductors parallel to each other in a single, flat plane. For example, ribbon wires 20 may include a plurality of individual wires parallel to a longitudinal axis of the ribbon wire 20, where the longitudinal axis is the axis along ribbon wire 20 from a first end of ribbon wire 20 to a second end of ribbon wire 20, e.g., from a first end of ribbon wire 20 that electrically connects to base 14 to a second end of ribbon wire 20 that electrically connects to radar 12. A ribbon wire may be wider than it is thick due to the placement of a plurality of wires adjacent to each other. In other examples, individual wires or another type of wire may be used in place of ribbon wires 20. Ribbon wires 20 may have the desirable stiffness to change geometry (e.g., tighten and loosen) within a clockspring structure 18A, 18B or 18C as radar 12 rotates relative to base 14 about the x-axis.

In some examples, ribbon wires 20 lie flat within clockspring passes 18. For example, a ribbon wire 20 may be wound around a component of a clockspring pass 18A-18C such that a major surface of ribbon wire 20 is wrapped around clockspring pass 18A, 18B, or 18C, the clockspring pass being sized to accommodate the width (e.g., as measured in a direction perpendicular to the longitudinal axis of the ribbon wire and parallel to the major surface of the wire) of the ribbon wire in the wrap direction. In this way, ribbon wires 20 may take up less space and/or be less likely to become tangled during the movement and/or rotation of gimbal assembly 16 and clockspring passes 18 in comparison to some radar systems that do not include clockspring passes 18, e.g., a "flying cable" configuration.

In some examples, a single ribbon wire 20 may be used to electrically connect radar 12 to base 14. In some such examples, a single clockspring pass, e.g., one of clockspring pass 18A, 18B, or 18C, may be used to route the single ribbon wire 20 from base 14 to radar 12. In some examples, however, the use of a single ribbon wire 20 for all the electrical connections between radar 12 and base 14 can result in ribbon wire 20 being relatively wide (e.g., as measured in a direction perpendicular to the longitudinal axis of ribbon wire 20) in order to accommodate the wires needed for all the electrical connections. Additionally, or alternatively, the use of a single ribbon wire 20 having a relatively large width may result in clockspring pass 18A, 18B, or 18C and/or gimbal assembly 16 also being large in order to accommodate the single ribbon wire 20. Due to size constraints of radar system 10 and/or gimbal assembly 16 in some examples, the use of a single ribbon wire 20 and a single clockspring pass 18A, 18B, or 18C may not be feasible. In addition, a single ribbon wire 20 may make the electrical connections between base 14 and radar 12 more difficult to achieve. For example, a single ribbon wire 20 may contact an antenna element of radar 12, e.g., a component of RF module 15, and/or a base 14 electronic component more difficult in that the single ribbon wire 20 may not be able to be routed in different directions and/or distances to or from various antenna elements or base electronic components.

In some examples, a relatively small width ribbon wire 20 (having fewer wires/conductors than the relatively wide ribbon wire discussed above) and/or a smaller gimbal assembly 16 may be better suited to a particular radar system 10. For example, a smaller gimbal assembly 16 may allow radar system 10 to fit into the nose of a small aircraft, whereas radar system 10 with a larger gimbal assembly 16 may not fit and/or may not function properly in the nose of a small aircraft. In examples in which a relatively small width ribbon wire 20 is used with radar system 10, ribbon wires 20 may be stacked (along their major surfaces), and the stack of two or more ribbon wires may be routed through one of clockspring passes 18A-18C. In some examples, a plurality of clockspring passes 18 may be used such that at least one ribbon wire of the stack of ribbon wires 20 may be routed through a different clockspring pass than the rest of the stack of ribbon wires 20.

In some examples, more than one ribbon wire 20 may be routed through a single clockspring pass 18A, 18B, or 18C. For example, two or more ribbon wires 20 may be stacked on top of one another and spirally wound around the same clockspring pass 18A-18C. As an example, the stack of ribbon wires 20 may include six ribbon wires, and a first and a second ribbon wire of the stack of ribbon wires 20 may be routed through a first clockspring pass 18A, a third and a fourth ribbon wire of the stack of ribbon wires 20 may be routed through a second clockspring pass 18B, and a fifth and a sixth ribbon wire of the stack of ribbon wires 20 may be routed through a third clockspring pass 18C. In this example, each of the pairs of ribbon wires 20 define a sub-stack of ribbon wires 20. In other examples, sub-stacks of ribbon wires can include one or three or more ribbon wires 20, such as, but not limited to, three, four, five, or six ribbon wires 20.

Winding multiple ribbon wires around a common clockspring pass 18A, 18B, or 18C may further help reduce the overall footprint (or volume) occupied by radar system 10 while still allowing for a plurality of electrical connections between base 14 and radar 12 to be routed through clockspring passes 18. In this way, the combination of ribbon wires 20 and clockspring passes 18 may allow radar system 10 to be relatively compact and/or help prevent ribbon wires 20 from twisting, bending, turning, or the like during normal operation of radar system 10.

In examples in which plurality of clockspring passes 18 is used to route ribbon wires 20 through gimbal assembly 16, the electrical connections between radar 12 and base 14 are divided among a plurality of relatively smaller ribbon wires 20, such that relatively smaller clockspring passes 18 may be used to route the wires 20. Each ribbon wire of plurality of ribbon wires 20 may be routed between base 14 and radar 12 though one clockspring pass 18A-18C. As described above, plurality of clockspring passes 18 enable each ribbon wire to tighten and loosen within a clockspring pass 18A-18C as radar 12 rotates relative to base 14. In some examples, clockspring passes 18 allows ribbon wires 20 to tighten and loosen around the clockspring pass structure as radar 12 rotates relative to base 14 about the x-axis.

Ribbon wires 20 may be arranged through the plurality of clockspring passes 18A-18C using any suitable technique. In some examples, ribbon wires 20 may be arranged and divided between clockspring passes 18A-18C based on the part of the radar 12 and/or the base 14 to which the wire is electrically connected. For example, each ribbon wire 20 may be routed through the same clockspring pass 18A-18C as one or more other ribbon wires 20 pertaining to a same or similar function or electrical connection between the same component of base electronics and radar 12. As an example, ribbon wires 20 configured to power radar 12 may be routed through clockspring pass 18A, ribbon wires 20 configured to transmit data signals from radar 12 to base 14 may be routed through clockspring pass 18B, and ribbon wires 20 configured to control the orientation of radar 12 may be routed through clockspring pass 18C. In some examples, plurality of ribbon wires 20 may be configured to electrically connect base 14 and radar 12 for more than three functions and/or components. In some such examples, each clockspring pass 18A-18C may include ribbon wires 20 for more than one function. In other examples, plurality of ribbon wires 20 may not be separated through each clockspring pass 18A-18C based on the function or type of electrical connection between the same component of base electronics and radar 12.

In some examples, radar system 10 may include another wire routing mechanism to facilitate routing of wires between radar 12 and base 14 in one or more other directions. The additional wire routing mechanism can, for example, be positioned to route ribbon wires 20 from base 14 to clockspring passes 18 and/or from clockspring passes 18 to radar 12. The additional wiring mechanism may allow ribbon wires 20 be routed from base 14 to radar 12 in a more controlled manner than clockspring passes 18 alone or a radar system including no routing mechanisms, such as a "flying cable" configuration. As described above, routing ribbon wires 20 in a more controlled manner may increase the useful life of ribbon wires 20 as a result of lower stresses on ribbon wires 20 during normal movement of radar 12.

In some examples, the additional wire routing mechanism includes pendulum member 22, which is configured to route ribbon wires from base 14 to clockspring passes 18 and/or from clockspring passes 18 to radar 12 to protect and/or control movement of ribbon wires 20 as radar 12 rotates relative to base 14 about a second axis, e.g., about the y-axis of FIG. 1. Pendulum member 22 defines a housing-type structure for ribbon wires 20. For example, pendulum member 22 may be substantially enclosed. In some examples, pendulum member 22 is configured to rotate about the second axis from a pivot point at one end of pendulum member 22. As an example, the pivot point may be at one end of pendulum member 22 so that pendulum member 22 can rotate about the y-axis in a back and forth manner, e.g., similar to oscillation of a pendulum. In some examples, pendulum member 22 includes at least two apertures to route ribbon wires 20 through pendulum member 22, such as, for example, one aperture at each end of pendulum member 22. In some cases, pendulum member 22 has one aperture that is larger than another aperture. In some such cases, the larger aperture may be on the opposite end of pendulum member 22 than the pivot point of pendulum member 22. Pendulum member 22 including a larger aperture on the opposite end of pendulum member 22 than the pivot point may allow pendulum member 22 to move in a back and forth manner without necessarily moving ribbon wires 20, which in turn may extend the useful life of ribbon wires 20 due to less strain on ribbon wires 20 and/or less repetitive movement of ribbon wires 20. Additionally, or alternatively, pendulum member 22 may protect ribbon wires 20 from external contaminants, forces, and/or may shield moving parts in system 10 by acting as a housing-type structure.

In some examples, ribbon wires 20 may move within pendulum member 22, with or without pendulum member 22 also moving, but the full movement of ribbon wires 20 may be restricted by pendulum member 22. For example, pendulum member 22 may restrict the movement of ribbon wires 20 and therefore may help prevent ribbon wires 20 from experiencing a sharper bend radius, which in turn may increase the useful life of ribbon wires 20.

Pendulum member 22 may route ribbon wires 20 from base 14 into the plurality of clockspring passes 18. In some examples, ribbon wires 20 form a single stack of ribbon wires 20 as they are routed through pendulum member 22, and then, after ribbon wires 20 exit pendulum member 22, ribbon wires 20 are split into sub-stacks that are routed through respective clockspring passes 18A-18C. Because pendulum member 22 helps position wires 20 within radar system 10, pendulum member 22 may help prevent ribbon wires 20 from being configured in a "flying cable" type wiring arrangement from base 14 to clockspring passes 18. In this way, the potential of ribbon wires 20 or a portion of ribbon wires 20 repeatedly twisting, turning, or bending as radar 12 rotates relative to base 14 may be lessened in comparison to some radar systems that do not include pendulum member 22.

Figure 3:
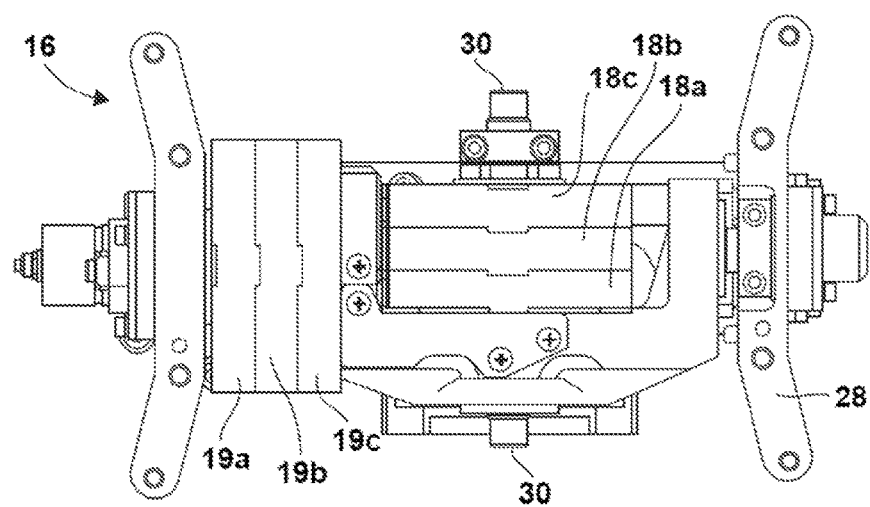
FIG. 3 is a conceptual and schematic diagram illustrating an example gimbal assembly, a first plurality of clockspring passes, and a second plurality of clockspring passes.

In some examples, as described with respect to FIG. 3, a second plurality of clockspring passes may be used in addition to, or as an alternative to, pendulum member 22 to facilitate routing of ribbon wires 20 between radar 12 and base 14. The second plurality of clockspring passes may be the same or substantially the same as plurality of clockspring passes 18, but oriented in a different direction. For example, the second plurality of clockspring passes may be configured such that ribbon wires 20 tighten and loosen within the clockspring passes of the second plurality of clockspring passes as radar 12 rotates relative to base 14 about the y-axis of FIG. 1.

Figure 2A:
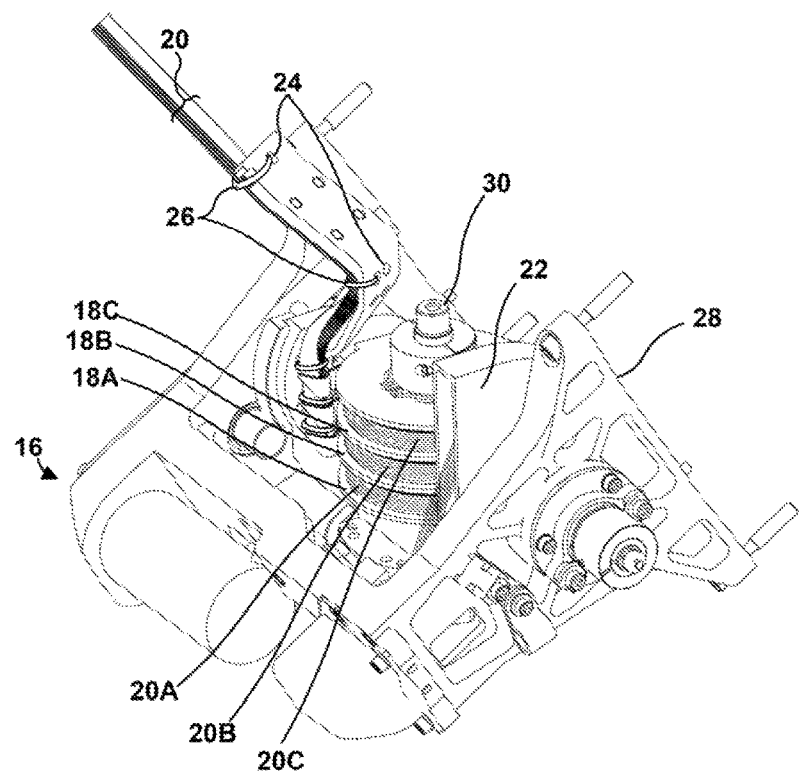
FIGS. 2A-2C are conceptual and schematic diagrams illustrating the example gimbal assembly and the example plurality of clockspring passes of FIG. 1.
Figure 2B:
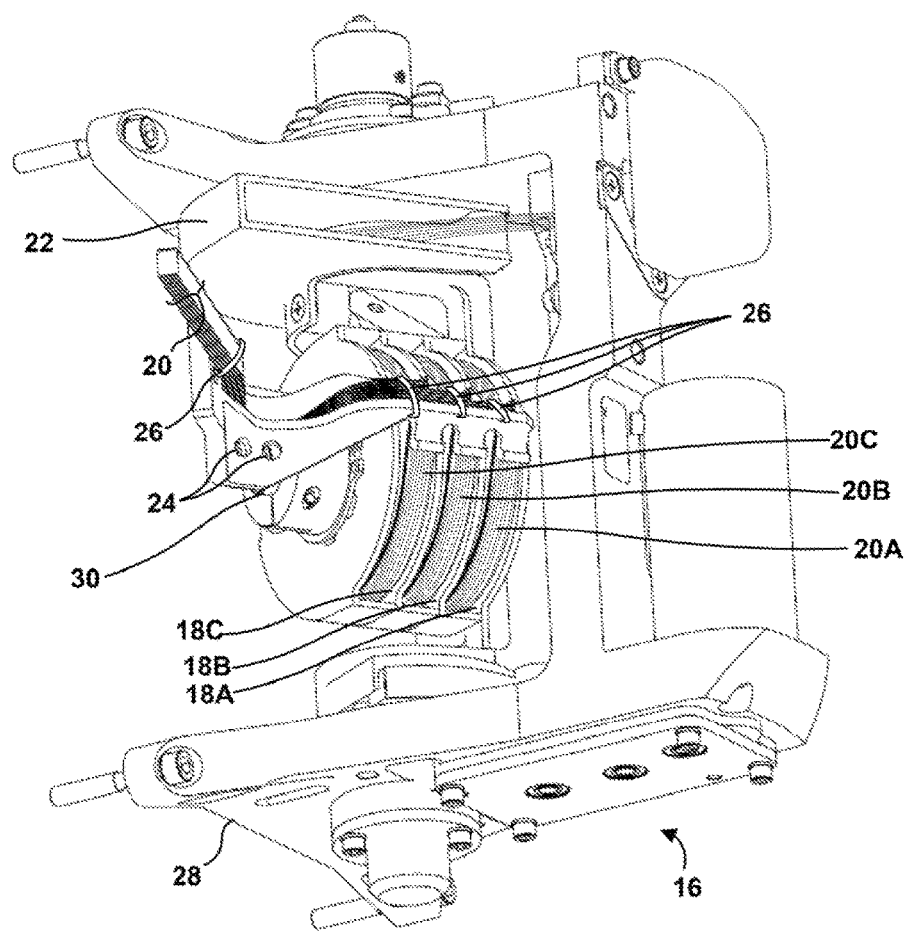
Figure 2C:
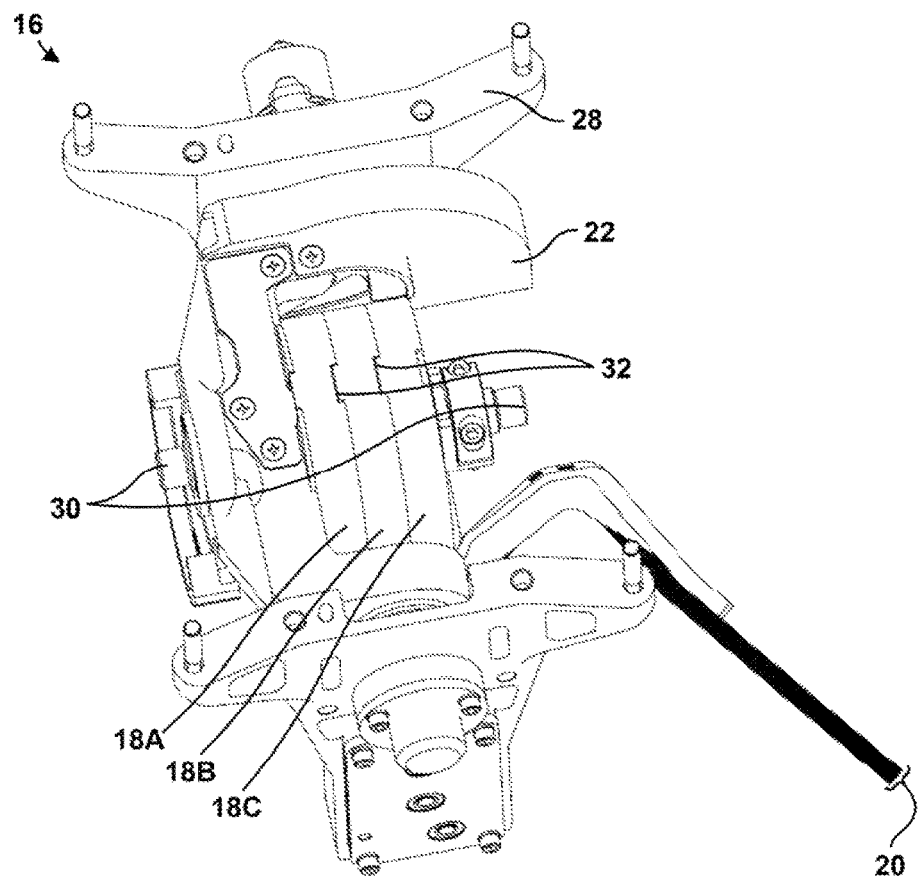

FIGS. 2A-2C are conceptual and schematic diagrams illustrating different views of the example gimbal assembly 16 and the example plurality of clockspring passes 18 of FIG. 1. Gimbal assembly 16 may be configured to mechanically connect radar 12 to base 14. For example, a first end 28 of gimbal assembly 16 may be configured to be attached to radar 12, and a shaft end 30 of gimbal assembly 16 may be configured to be attached to base 14, (or extensions, such as yoke arms, of base 14). Gimbal assembly 16 may be attached to base 14 and radar 12 by any suitable connection mechanism, such as, but not limited to, bearings, bushings, adhesive, welding, nuts and bolts, and the like, to allow movement of radar 12 relative to base 14 and to secure attachment of radar 12 to base 14.

In some examples, ribbon wires 20 are affixed to a specific location within gimbal assembly 16. Affixing ribbon wires 20 to a specific location within gimbal assembly 16 may help keep ribbon wires 20 in place within gimbal assembly 16, which in turn may allow gimbal assembly 16 to move without ribbon wires 20 becoming displaced and/or interfering with the movement of gimbal assembly 16. Additionally, or alternatively, affixing ribbon wires 20 to a specific location within gimbal assembly 16 may enable clockspring passes 18 and/or pendulum member 22 to function properly, e.g., to allow ribbon wires 20 to tighten, loosen, or otherwise move without excessive twisting, bending, or turning that may shorten the useful life of ribbon wires 20.

In some examples, ribbon wires 20 define a stack of ribbon wires on either side of clockspring passes 18. For example, ribbon wires 20 may form a single stack of ribbon wires 20, and at a first location, this single stack of ribbon wires may be affixed to a component that does not rotate relative to radar 12 (e.g., affixed to base 14). The single stack of ribbon wires may then be split into a plurality of sub-stacks of ribbon wires that each have a fewer number of ribbon wires 20 than the single stack. Each of these sub-stacks may then be routed through respective clockspring passes 18A-18C. After being routed through the respective clockspring passes 18A-18C, the sub-stacks of ribbon wires 20 may then be restacked into the single stack of ribbon wires 20. This single stack of ribbon wires 20 may then be affixed to gimbal assembly 16 or to radar 12 at a second location.

In some examples, a structure of gimbal assembly 16 and/or clockspring passes 18 defines one or more holes 24, which may be used to affix ribbon wires 20 to a specific location within gimbal assembly 16. Holes 24 may be located anywhere in which affixing ribbon wires 20 to a specific location within radar system 10 may be deemed useful. As an example, one or more holes 24 may be located where ribbon wires 20 exit gimbal assembly 16, where ribbon wires 20 exit clockspring passes 18, and/or at a point in which ribbon wires 20 change direction. In other examples, radar system 10 may include holes 24 in additional or alternative locations within radar system 10, or radar system 10 may not include holes 24.

In some examples, fastening mechanisms 26 may be used to affix ribbon wires 20 to a specific location within radar system 10 using holes 24. In some examples, fastening mechanism 26 may be a zip tie, a string, a wire, or any other fastening mechanisms 26 capable of being inserted into hole 24 and used to affix ribbon wires 20 in place. In other examples, fastening mechanisms 26 may be configured to affix ribbon wires 20 in place without the use of holes 24, such as, for example, a bracket, a clamp, a mechanical fastener, e.g., a bolt or a screw, a cover, or the like. As an example, fastening mechanisms 26 may be a zip tie which may be tightened around ribbon wires 20 and a structure of gimbal assembly 16 such that ribbon wires 20 are affixed to gimbal assembly 16 in that location, with or without the use of holes 24.

Fastening mechanisms 26 may be wrapped around, tightened around, clamped to, mechanically fastened to, e.g., using bolts or screws, or the like, a structure of radar system 10 to affix ribbon wires 20 to a location within radar system 10. In some examples, fastening mechanisms 26 may not permanently affix ribbon wires 20 to gimbal assembly 16. In this way, fastening mechanisms 26 and/or ribbon wires 20 may be able to be removed, replaced, rerouted, or the like. In some examples, fastening mechanisms 26 permit very little movement of ribbon wires 20 relative to the specific location ribbon wires 20 are affixed to. In some examples, radar system 10 may include more than one type of fastening mechanism 26. In other examples, radar system 10 may not include fastening mechanisms 26.

In some examples, clockspring passes 18 are configured to be physically nested with each other to prevent movement of one or more clockspring passes 18 relative to each other. For example, as best seen in FIG. 2C, each of clockspring passes 18 may include a protrusion and/or an indentation configured to mate with a protrusion and/or an indentation of another clockspring pass 18A-18C to form a nesting interface 32. For example, clockspring pass 18A may include an indentation that mates with a protrusion of clockspring pass 18B to form a nesting interface 32, and clockspring pass 18B may include an indentation that mates with a protrusion of clockspring pass 18C to form another nesting interface 32. Nesting interfaces 32 may prevent any one of clockspring passes 18 from rotating relative to each other, which in turn may enable clockspring passes 18 to function properly. For example, nesting interfaces 32 may enable clockspring passes 18 to rotate together as radar 12 rotates about the x-axis. Alternatively, or in addition, nesting interfaces 32 may prevent relative rotation of clockspring passes 18 without clockspring passes 18 being permanently attached to each other.

In other examples, in addition to or instead of nesting interfaces 32, clockspring passes 18 may be prevented from rotating relative to each other in a different manner. For example, clockspring passes 18 may be prevented from rotating relative to each other through the use of external attachment mechanisms, e.g., brackets, screws, nuts, bolts, zip-ties, adhesive, or the like.

Additionally, or alternatively, nesting clockspring passes 18 may also enable plurality of clockspring passes 18 to occupy a smaller volume of space than some clockspring passes that are not nested together. For example, clockspring passes 18 that are nested with each other may have little or no extra space between each clockspring pass 18A-18C. In this way, plurality of clockspring passes 18 may be feasible for use in relatively compact applications, such as, for example, in the nose of a small aircraft.

In some examples, radar 12 is configured to rotate relative to base 14 about a third axis, e.g., about the z-axis of FIG. 1. In some such examples, radar system 10 may further include a wire routing mechanism to help route wires to accommodate the movement of ribbon wires 20 as radar 12 moves relative to base 14 about the third axis. For example, radar system 10 may include a second plurality of clockspring passes in addition to first plurality of clockspring passes 18 and pendulum member 22. As another example, radar system 10 may include a third plurality of clockspring passes in addition to first plurality of clockspring passes 18 and a second plurality of clockspring passes.

FIG. 3 is a conceptual and schematic diagram illustrating an example gimbal assembly 16, a first plurality of clockspring passes 18, and a second plurality of clockspring passes 19A-19C (collectively referred to herein as "second plurality of clockspring passes 19"). Second plurality of clockspring passes 19 may be the same or substantially the same as plurality of clockspring passes 18, but may be configured to permit ribbon wires 20 to tighten and loosen as radar 12 rotates relative to base 14 about the second axis, e.g., the y-axis of FIG. 1. As with first plurality of clockspring passes 18, second plurality of clockspring passes 19 may lessen the footprint of radar system 10, prevent ribbon wires 20 from being repetitively twisted, bent, or strained, or the like. In some examples, radar system 10 may include second plurality of clockspring passes 19 in place of pendulum member 22 (as shown in FIG. 3). In other examples, radar system 10 may include both second plurality of clockspring passes 19 and pendulum member 22. As an example, radar system 10 may include first plurality of clockspring passes 18 configured such that ribbon wires can tighten and loosen around first plurality of clockspring passes 18 as radar 12 rotates relative to base 14 about the x-axis of FIG. 1, pendulum member 22 configured to rotate about the y-axis of FIG. 1 in a back and forth manner, and second plurality of clockspring passes 19 configured such that ribbon wires can tighten and loosen around second plurality of clockspring passes 19 as radar 12 rotates relative to base 14 about the z-axis of FIG. 1.

In some examples, radar system 10 may include a third plurality of clockspring passes (not shown). In some such examples, each plurality of clockspring passes, may be configured such that ribbon wires 20 tighten or loosen around a structure of a clockspring pass of each plurality of clockspring passes as radar 12 rotates relative to base 14 about a different axis. For example, first plurality of clockspring passes 18 may be configured such that ribbon wires 20 tighten or loosen around a component of a clockspring pass of first plurality of clockspring passes 18 as radar 12 rotates relative to base 14 about the x-axis of FIG. 1, second plurality of clockspring passes 19 may be configured such that ribbon wires 20 tighten or loosen around a component of a clockspring pass of second plurality of clockspring passes 19 as radar 12 rotates relative to base 14 about the y-axis of FIG. 1, and the third plurality of clockspring passes may be configured such that ribbon wires 20 tighten or loosen around a component of a clockspring pass of the third plurality of clockspring passes as radar 12 rotates relative to base 14 about the z-axis of FIG. 1.

Figure 4:
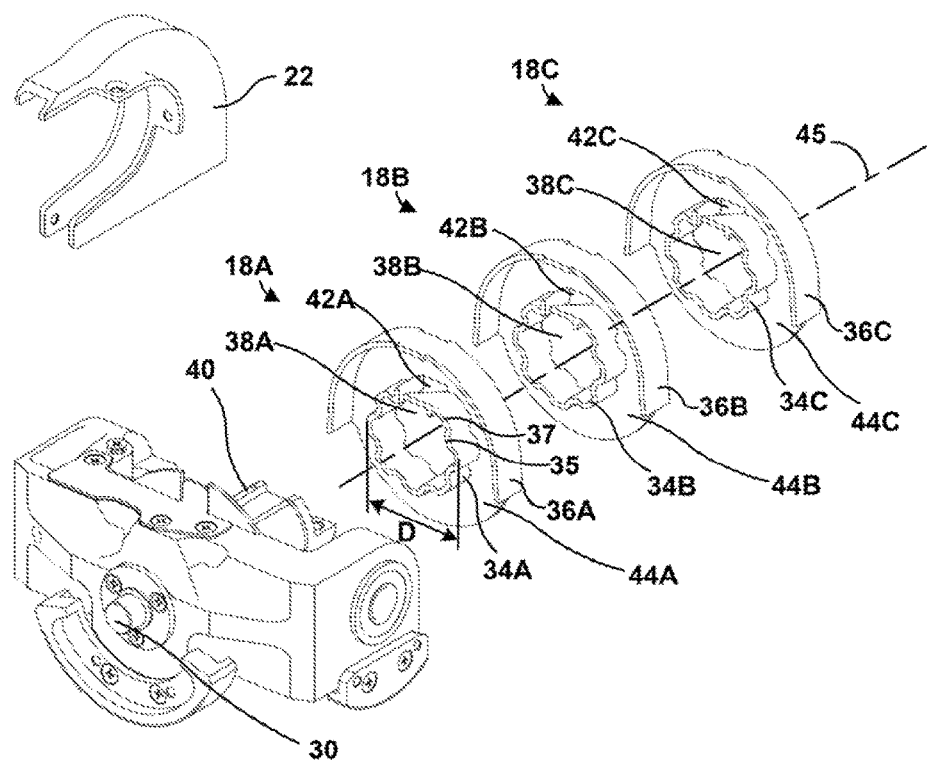
FIG. 4 is an exploded view of the example gimbal assembly and the example plurality of clockspring passes of FIG. 1.

FIG. 4 is an exploded view of the example gimbal assembly 16 and the example plurality of clockspring passes 18 of FIG. 1. Unlike FIGS. 2A-2C, however, FIG. 4 does not illustrate first end 28 of gimbal assembly 16 or ribbon wires 20.

When stacked together along axis 45, clockspring passes 18 are coaxial. As shown in FIG. 4, each clockspring pass 18A-18C includes a respective internal structure 34A-34C. Each of clockspring passes 18 may include an internal structure 34A-34C (collectively, "internal structures 34") around which one or more ribbon wires 20 are coiled, and with respect to which ribbon wires 20 tighten and loosen. Internal structures 34 facilitates spiral winding of ribbon wires 20 within each clockspring pass 18A-18C, and enable the ribbon wires 20 to tighten and loosen during rotation of radar 12 relative to base 14. For example, each ribbon wire 20, or a stack of ribbon wires 20, may enter clockspring pass 18A, 18B, or 18C, and may be spirally wrapped in a clockwise or counterclockwise manner around the respective internal structure 34A, 34B, or 34C.

Internal structures 34 may help keep ribbon wires 20 within the clockspring passes 18, and provide a structure around which ribbon wires 20 can tighten and loosen around as radar 12 rotates relative to base 14. Ribbon wires coiled around a particular internal structure 34 may not directly contact the entire outer surface of internal structure 34 at all times. Rather, in a relatively loose coil of a particular ribbon wire 20, ribbon wire 20 may only partially contact the particular internal structure 34 or may not contact the particular internal structure 34 at all, depending on whether it is directly adjacent to internal structure 34 or separated from internal structure 34 by another wire 20, or whether the diameter (or other width dimension) of the coil defined by the wire 20 around the internal structure 34 is greater than or equal to the outer diameter (or other width dimension) of internal structure 34. Internal structures 34 may define the bend radius experienced by ribbon wires 20 when ribbon wires 20 are fully tightened around the respective internal structure 34. For example, half of the width D of a particular internal structure 34 may correspond to the bend radius experienced by the one or more ribbon wires 20 within the respective clockspring pass 18A-18C when ribbon wires 20 are fully tightened around the respective internal structure 34.

In some examples, each ribbon wire 20, or alternatively a stack of ribbon wires 20, are wrapped around each internal structure 34 more than once, which may enable clockspring passes 18 to accommodate a greater change in circumferential position of radar 12 relative to base 14 during normal movement of radar 12 relative to base 14. For example, if each ribbon wire 20 or stack of ribbon wires 20 is wrapped around each internal structure 34 more than once, there may be more length (e.g., as measured in the longitudinal direction of the respective ribbon wire 20) to tighten and loosen around the respective internal structure 34A-34C due to rotation of clockspring passes 18 during normal movement of radar 12. In turn, rotation of clockspring passes 18 may not be impeded due to complete tightening or loosening of ribbon wires 20 around internal structures 34 based on the length (e.g., as measured in the longitudinal direction of the respective ribbon wire 20) of ribbon wires 20 routed through each clockspring pass 18A-18C between a first fixed location prior to or upon ribbon wires 20 entering the clockspring pass 18A-18C and a second fixed location after or upon ribbon wires 20 exiting the clockspring pass 18A-18C. For similar reasons, in some examples, an excess length of ribbon wires 20 may be routed through clockspring passes 18 and/or wrapped around internal structures 34.

In some examples, a ribbon wire 20 is wound around an internal structure 34 at least twice, such as about 2 times, 2.5 times, 3 times, or even 4 times or more. The number of times a ribbon wire 20 is wound around an internal structure 34 can be defined by, for example, the number of full rotations of the wire 20 around the internal structure 34.

In some examples, the rotation of radar 12 relative to base 14 about a first axis in a first direction may result in ribbon wires 20 tightening around internal structure 34A-34C of the respective clockspring pass 18A-18C such that ribbon wires 20 are wound around internal structure 34A-34C more times than when ribbon wires 20 are in an initial coil configuration relative to internal structure 34A-34C (e.g., in a neutral position).

As shown in FIG. 4, internal structures 34 may each have a circular or a near circular shape, and may be cylindrical or near-cylindrical structures. In other examples, internal structures 34 are a shape other than near circular and/or circular. The circular or near circular shape may help accommodate the tightening and loosening of ribbon wires 20, and may reduce the stresses on wires 20 that are coiled around internal structures 34. For example, internal structures 34 with a shape that does not include sharp corners and/or bends may put less strain on ribbon wires than some internal structures 34 with shapes including sharp corners and/or bends. For example, a circular or a near circular shape of internal structures 34, e.g., as in FIG. 4, may allow ribbon wires 20 to tighten around internal structures 34 without being subjected to sharp bends or turns in comparison to an internal structure that is a square, triangle, or other shape including sharp corners and/or bends. Additionally, or alternatively, internal structures 34 without sharp corners and/or bends may enable the ribbon wires to tighten and loosen during normal movement of the radar with greater ease, e.g., with less pulling, straining, or the like. In some examples, each internal structure 34A-34C of clockspring passes 18 is the same shape. In other examples, one or more internal structures 34A-34C are a different shape than another internal structure 34A-34C.

Internal structures 34 that include a near circular shape with staggered walls, as shown in FIG. 4, may allow the weight of radar system 10 to be reduced while also help preventing ribbon wires 20 from being subjected to sharp bends. For example, an inner staggered portion 35 of internal structures 34 may define an inner diameter of internal structures 34 that mates with an inner gimbal structure 40 (configured to mount clockspring passes 18 within radar system 10), and outer staggered portion 37 may define an outer diameter of internal structures 34 for ribbon wires 20 to coil around. In this way, a single, staggered internal structure 34 may allow clockspring passes 18 to be tailored to fit particular needs.

In some examples, inner staggered portion 35 defines a smaller inner diameter than the outer diameter defined by outer staggered portion 37. This may enable clockspring passes 18 to mate with a relatively small inner gimbal structure 40 without adversely affecting the bend radii of ribbon wires 20 coiled around internal structures 34, or without requiring clockspring passes 18 to include more than one internal structure 34 or a thicker (measured in the radial direction) internal structure 34 that defines the inner and outer diameters. The smaller inner gimbal structure 40 may allow the overall weight of radar system 10 to be reduced.

Internal structures 34 may be any size feasible in order to accommodate ribbon wires 20 routed through clockspring passes 18. In some examples, a radar system including a larger number of ribbon wires 20 routed through each clockspring pass 18A-18C may have internal structures 34 that are smaller than some internal structures 34 of a radar system including a smaller number of ribbon wires 20 routed through each clockspring pass 18A-18C. Additionally, or alternatively, the size of internal structures 34 may be based on the number of ribbon wires 20 and/or the length of each ribbon wire 20 wrapped around each internal structure 34A-34C. In some examples, each internal structure 34A-34C of clockspring passes 18 is the same size. In other examples, one or more internal structures 34A-34C is a different size than another internal structure 34A-34C.

In some examples, clockspring passes 18 are configured to facilitate tightening and loosening of ribbon wires 20 around internal structures 34. For example, clockspring passes 18 may include a respective external wall 36A-36C (collectively referred to herein as "external walls 36") radially outward of the respective internal structure 34A-34C. External walls 36 may help retain ribbon wires 20 within the respective clockspring pass 18A-18C, may help ribbon wires 20 from loosening too much (e.g., such that ribbon wires 20 come off of the respective clockspring pass 18A-18C), and may also help facilitate proper tightening and loosening of ribbon wires 20 by guiding ribbon wires 20 into place around the respective internal component 34 and/or within the respective channel of the proper clockspring pass 18A-18C. As an example, external walls 36 may help prevent ribbon wires 20 from shifting to coil around a different clockspring pass 18A-18C than the ribbon wire 20 is configured to tighten and loosen around. For example, external wall 36A may facilitate each ribbon wire 20 in clockspring pass 18A to tighten and loosen around internal structure 34A, without shifting into and/or wrapping around clockspring pass 18B or 18C. Additionally, or alternatively, external walls 36 may protect ribbon wires 20 in clockspring passes 18 from external contaminants or forces by acting as a housing-type structure when clockspring passes 18 are stacked together.

In some examples, the radial distance between internal structures 34 and external walls 36 may be sufficiently large such that ribbon wires 20 can be fully loosened around internal structures 34 when clockspring passes 18 are rotated fully in one direction, e.g., due to rotation of radar 12 relative to base 14 about the first axis in the second direction. For example, the radial distance from internal structures 34 and external walls 36 may be sufficiently large such that ribbon wires 20 do not bend, kink, or bunch up when ribbon wires 20 form a relatively coil around the respective clockspring pass 18A-18C.

In some examples, external walls 36 encompass half or a majority of the perimeter (e.g., circumference) of each clockspring pass 18A-18C. In other examples, external walls 36 encompass less than half of the perimeter of each clockspring pass 18A-18C.

Each clockspring pass 18A-18C may include a side wall 44A-44C (collectively referred to herein as "side walls 44"). Side walls 44 may separate each clockspring pass 18A-18C from another clockspring pass 18A-18C, and may prevent ribbon wires 20 from slipping off and/or unintentionally loosening from internal structure 34A-34C. For example, when clockspring passes 18 are stacked as shown in FIGS. 2A-2C, ribbon wires 20 may not be able to move in a direction perpendicular to the longitudinal direction of ribbon wires 20, e.g., in a direction which could lead to ribbon wires 20 slipping off internal structure 34A, 34B, or 34C.

In some examples, clockspring passes 18 are open radially inward of internal structures 34A-34C to define stack openings 38A-38C (collectively referred to herein as "stack openings 38"). In the example shown in FIG. 4, stack openings 38 are defined by respective side walls 44. Stack openings 38 are configured to receive a portion of inner gimbal structure 40 of gimbal assembly 16, and enable clockspring passes 18 to be stacked and/or nested together on inner gimbal structure 40. Stack openings 38 may be any shape and/or size to accommodate inner gimbal structure 40. In some examples, internal structures 34 and/or inner gimbal structure 40 includes a notch and/or are shaped or sized such that clockspring passes 18 cannot rotate relative to inner gimbal structure 40. Instead, normal movement of radar 12 relative to base 14 may facilitate movement of inner gimbal structure 40 and clockspring passes 18 together, e.g., inner gimbal structure 40 is configured to rotate, which in turn rotates clockspring passes 18. Such a fixed orientation on inner gimbal structure 40 may enable ribbon wires 20 to tighten and loosen around internal structures 34A-34C rather than the plurality of clockspring passes 18 themselves rotating.

In some examples, clockspring passes 18 are not configured to rotate about axis 45 and remain relatively stationary (e.g., no significant movement) relative to internal gimbal structure 40 or even radar 12 or base 14 as radar 12 rotates relative to base 14 during operation of radar system 10, such as, in examples in which the effective length of ribbon wires 20 are increased or decreased by the tightening or loosening of ribbon wires 20 around internal structures 34, respectively, due to the movement of radar 12 relative to base 14. Rotational axis 45 may extend in a direction orthogonal to a major surface of side walls 44 when clockspring passes 18 are stacked together in the manner shown in FIG. 2C.

In other examples, clockspring passes 18 are configured to rotate about axis 45 as radar 12 rotates relative to base 14 during operation of radar system 10. In these examples, clockspring passes 18 may rotate freely about axis 45 or may be biased to a designated zero position, which may be a position in which some or all of ribbon wires 20 are in a relatively neutral position, e.g., defining initial coil configurations. For example, inner gimbal structure 40 may include a spring-type mechanism that is configured to exert a force on clockspring passes 18 when clockspring passes 18 are displaced from the designated zero position, e.g., due to rotation of inner gimbal structure 40 resulting from movement of radar 12 during operation of radar 12, such that inner gimbal structure 40, and therefore, clockspring passes 18 return to the designated zero position. Ribbon wires 20 within clockspring pass 18A, 18B, or 18C may tighten from the respective internal structure 34A-34C as clockspring passes 18 are rotated about axis 45 in a first direction away from the designated zero position during movement of radar 12, and may loosen around the respective internal structure as clockspring passes 18 rotate about axis 45 in the other direction and approach the designated zero position during a different movement of radar 12.

Each ribbon wire 20, or a stack of ribbon wires 20, may be routed through one or more apertures 42A-42C (collectively referred to herein as "apertures 42") in order to access internal structure 34A-34C of clockspring pass 18A-18C, and in order to be coiled around one of internal structures 34A-34C. In some examples, internal structure 34A, 34B, or 34C, side wall 44A, 44B, or 44C, external wall 46A, 46B, or 46C, or combinations thereof may define the respective aperture 42A, 42B, or 42C. Apertures 42 may be any size and/or shape to accommodate ribbon wires 20 or the stack of ribbon wires 20 routed through the respective clockspring pass 18A-18C. In some examples, apertures 42 may all be a same or similar size and/or shape. In other examples, one or more apertures 42 may be a different size and/or shape than another one of apertures 42. In yet another example, some clockspring passes 18 may not include apertures 42.

In some examples, one or more ribbon wires 20 are routed through a single aperture 42A, 42B, or 42C to be wrapped around the respective internal structure 34A, 34B, or 34C. Additionally, or alternatively, one or more ribbon wires 20 may be routed through more than one apertures 42A-42C to be wrapped around one of internal structures 34A-34C. In some examples, one or more of apertures 42 are substantially aligned when clockspring passes 18 are stacked and/or nested on inner gimbal structure 40. As an example, three ribbon wires 20 are routed through pendulum member 22 and into aperture 42C, where one of the three ribbon wires 20 is wrapped around internal structure 34C and the two other ribbon wires 20 are routed through aperture 42B, in which one of the two ribbon wires 20 is wrapped around internal structure 34B and the remaining ribbon wire 20 is routed through aperture 42A to be wrapped around internal structure 34A. Ribbon wires 20 may be routed through any of apertures 42 in order to be wrapped around one of internal structures 34. In some examples, however, ribbon wires 20 may be routed to one of clockspring passes 18 to be wrapped around internal structures 34A-34C without the use of apertures 42.

In some examples, one or more ribbon wires 20 may be routed through each clockspring pass 18A-18C. For example, if radar system 10 includes a large number of electrical connections between radar 12 and base 14, or if radar system 10 is to fit into a relatively compact space, such as the nose of a small aircraft, two or more ribbon wires 20 may be routed through a particular clockspring pass 18A-18C. In some such examples, ribbon wires 20 may be stacked to be routed through a respective clockspring pass 18A, 18B, or 18C. For example, a first stack of ribbon wires 20 may be split in two or more sub-stacks of ribbon wires 20, smaller than the first stack, prior to or upon entering clockspring passes 18, where each sub-stack may be routed through a respective clockspring pass 18A, 18B, or 18C, and after or upon exiting clockspring passes 18, each sub-stack may be re-stacked to form a second stack, larger than each sub-stack, or ribbon wires 20.

Figure 5:
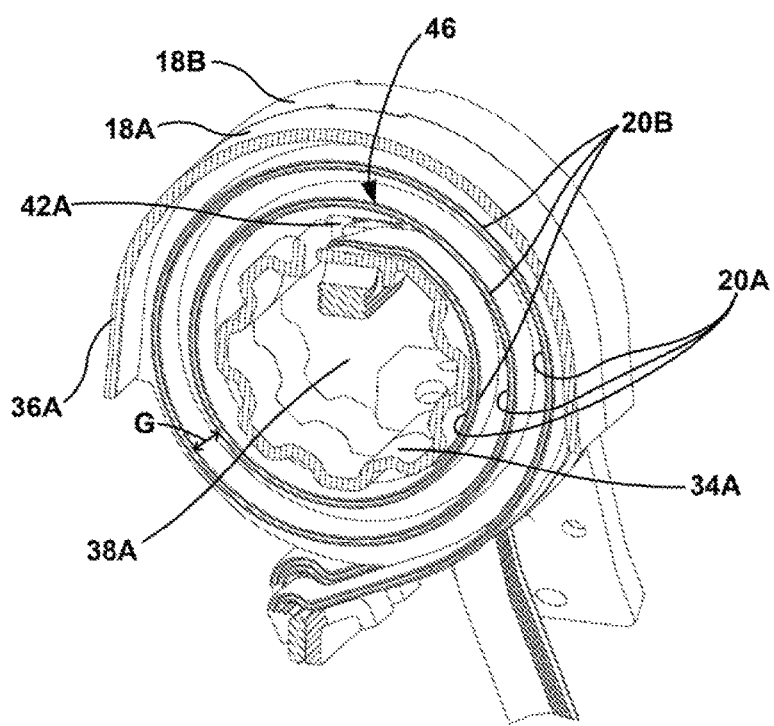
FIG. 5 is an exploded view of a stack of ribbon wires routed through a single clockspring pass of the example plurality of clockspring passes of FIG. 1.

FIG. 5 is a view of a stack 46 of ribbon wires 20A, 20B routed through a single clockspring pass 18A of the example plurality of clockspring passes 18 of FIG. 1. Stack 46 includes two ribbon wires, ribbon wire 20A and ribbon wire 20B, which are aligned to define respective layers of stack 46. In other examples, stack 46 may include greater than two ribbon wires, such as, three, four, or more than four ribbon wires. In the example shown in FIG. 5, wires 20 are stacked such that a major surface of a wire is adjacent a major surface of an adjacent wire.

As seen in FIG. 5, stack 46 is wrapped around internal structure 34A three times so that each wrap around internal structure 34A includes a layer of ribbon wire 20A and a layer of ribbon wire 20B. In this way, alternating layers of ribbon wire 20A and ribbon wire 20B are coiled around internal structure 34A. In other examples, however, stack 46 may be wrapped around internal structure 34A any number of times. First stacking ribbon wires 20A, 20B and then wrapping the resulting stack 46 around internal structure 34A may enable both ribbon wires 20A and 20B to tighten around internal structure 34A or loosen from internal structure 34A at the same time.

In the example shown in FIG. 5, ribbon wires 20A, 20B are loosely wound around internal structure 34A, such that there is a gap G (e.g., a space) between adjacent turns of stack 46. In an initial coil configuration of wires 20A, 20B, such as when radar 12 is in an initial rotational position relative to base 12, gap G may have a first value. As radar 12 rotates relative to base 14 about the x-axis (or another axis in other examples) in a first direction away from the initial rotational position, the coil defined by wires 20A, 20B may tighten around internal component 34A. In this tightened state of wires 20A, 20B, gap G may have a second value less than the first value. In some situations, gap G may be zero and a part of wire 20A may contact an adjacent turn of wire 20B. Additionally, as radar 12 rotates relative to base 14 about the x-axis (or another axis in other examples) in a second direction away from the initial rotational position, the coil defined by wires 20A, 20B may loosen around internal component 34A. In this loosened state of wires 20A, 20B, gap G may have a third value greater than the first value.

Figure 6:
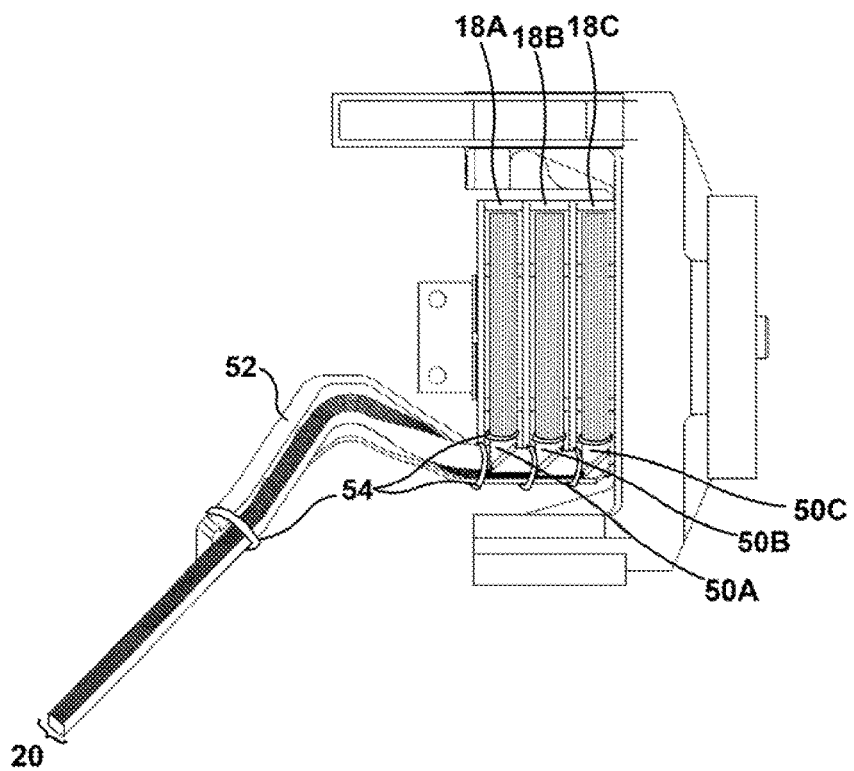
FIG. 6 is a conceptual and schematic diagram illustrating an example plurality of clockspring passes.

FIG. 6 is a conceptual and schematic diagram illustrating an example of the plurality of clockspring passes 18. As seen in FIG. 6, each clockspring pass 18A-18C may have one or more ribbon wires 20 routed through it. In some examples, radar system 10 or clockspring passes 18 may include additional support structures for ribbon wires 20. For example, as shown in FIG. 6, an arm 52 supports ribbon wires 20. In some examples, arm 52 may route ribbon wires from one position within radar system 10 to another position within radar system 10. For example, arm 52 may route ribbon wires 20 from clockspring passes 18 to radar 12. The use of arm 52 and/or other support structures may result in ribbon wires 20 being routed in a controlled manner and without the use of a "flying cable" configuration in more locations than a radar system that does not include arm 52 or other additional support structures. Additionally, or alternatively, arm 52 may be used to change the orientation of ribbon wires 20 and/or affix ribbon wires 20 in a specific location after or upon ribbon wires 20 exiting clockspring passes 18. For example, ribbon wires 20 may be in a first orientation upon exiting clockspring passes 18, and may be configured to be in a second orientation and affixed in a specific location with the use of arm 52.

In some examples, ribbon wires 20 are folded and/or turned at one or more positions of plurality of clockspring passes 18. For example, ribbon wires 20 may be folded and/or turned upon entering and/or exiting clockspring passes 18A-18C in order to route ribbon wires 20 in an intended direction. This may allow clockspring passes 18 to be stacked as shown and occupy a smaller footprint. In some examples, fastening mechanisms 54 may hold ribbon wires 20 in such a configuration. In this way, ribbon wires 20 may not be subject to repetitive bending and/or turning, but rather remain in a folded and/or turned configuration. Fastening mechanism 54 may be similar to fastening mechanism 26 (FIG. 2A) may be, for example, zip ties, strings, wires, clamps, brackets, or the like.

The use of fastening mechanisms 54 to hold ribbon wires 20 in a folded and/or turned configuration may result in less strain on ribbon wires 20 even though ribbon wires are folded and/or turned. Additionally, or alternatively, fastening mechanisms 54 may be used in other locations on the plurality of clockspring passes 18, such as, for example, on arm 52.

Fastening mechanisms 54 hold ribbon wires 20 between fastening mechanisms 54 and a structure of gimbal assembly 16 or another structure of radar system 10. In some examples, the portion of ribbon wires 20 in contact with fastening mechanisms 54 are held substantially stationary, while in other examples, ribbon wires 20 may slide between fastening mechanisms 54 and the structure of radar system 10.

Although fastening mechanisms 54 are configured to hold ribbon wires 20 in a folded and/or turned configuration in the plurality of clockspring passes 18, in some examples, fastening mechanisms 54 may be used in other parts of radar system 10, such as in pendulum member 22, gimbal assembly 16, base 14, and/or radar 12.

Figure 7:
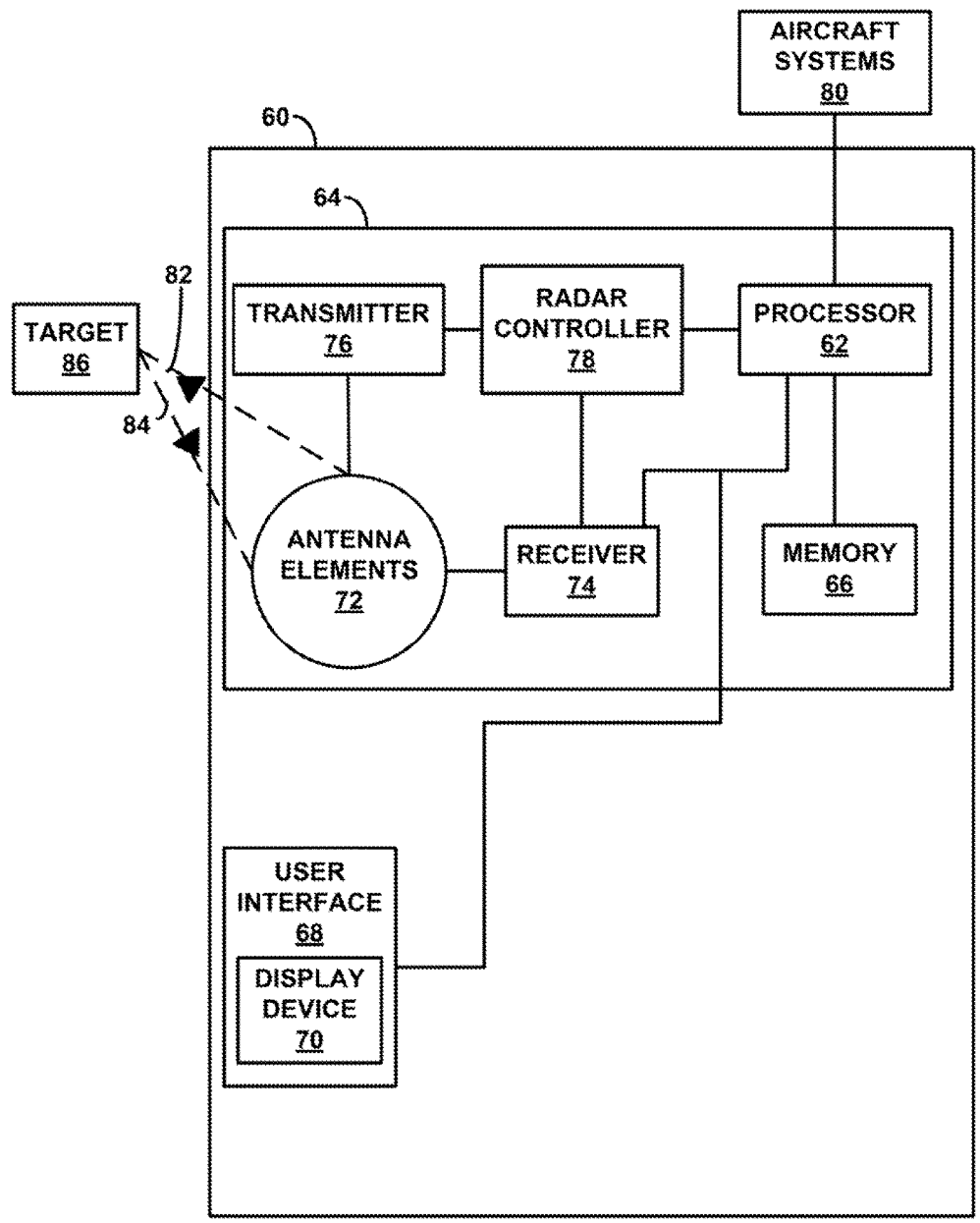
FIG. 7 is a block diagram illustrating details of an example vehicle system including a radar system.

FIG. 7 is a block diagram illustrating details of an example vehicle system 60 including a radar system 64, which is an example of radar system 10 of FIG. 1. The architecture of vehicle system 60 illustrated in FIG. 7 is shown for exemplary purposes only, and vehicle system 60 should not be limited to this architecture. In some examples, vehicle system 60 may include additional components that, for clarity, are not shown in FIG. 7. In other examples, vehicle system 60 may be configured in a variety of ways. Although described herein with respect to an aircraft, vehicle system 60, in some examples, may be onboard or external to a marine vessel, a land vehicle, or other vehicle.

Vehicle system 60 may be onboard an aircraft in some examples, and may be external to an aircraft in other examples. Vehicle system 60 includes radar system 64 and user interface 68, which includes display device 70. Radar system 64 includes processor 62 and memory 66. In other examples, radar system 64 may not include processor 62 and/or memory 66, but instead processor 62 and/or memory 66 may be separate from radar system 64 and electrically coupled to radar system 64. In either case, processor 62 may be electrically coupled to user interface 68, radar controller 78, receiver 74, transmitter 76, antenna elements 72, and/or memory 66. Processor 62 may also be configured to communicate with other various aircraft systems 80, which may include, for example, a flight management system (FMS), an air data computer (ADC), an Inertial Navigation System (INS), a Global Positioning System (GPS), or the like.

Processor 62, as well as other processors disclosed herein (including radar controller 78 discussed below), can include any suitable arrangement of hardware, software, firmware, processing circuitry, or any combination thereof, to perform the techniques attributed to processor 62 herein. For example, processor 62 may include any one or more microprocessors, digital signal processors (DSPs), application specific integrated circuits (ASICs), field programmable gate arrays (FPGAs), or any other equivalent integrated or discrete logic circuitry, as well as any combinations of such components. Memory 66 includes any volatile or non-volatile media, such as a RAM, ROM, non-volatile RAM (NVRAM), electrically erasable programmable ROM (EEPROM), flash memory, and the like. Memory 66 may store computer readable instructions that, when executed by processor 62 causes processor 62 to implement the techniques attributed to processor 62 herein.

Processor 62 is configured to generate radar information based on radar reflectivity data from receiver 74, antenna elements 72, and/or radar controller 78. Although not specifically shown in FIG. 7, aircraft systems 80 may include a communication system configured to receive radar data such as object detection, weather information, navigation information, or the like, from a reporting service, from another aircraft, or both. In some examples, processor 62 may use the additional radar data from aircraft systems 80 in order to generate additional or alternative radar information.

In the example shown in FIG. 7, radar system 64 includes antenna elements 72, receiver 74, transmitter 76, and radar controller 78. Under the control of radar controller 78, transmitter 76 is configured to generate and transmit radar signals 82 from antenna elements 72 into airspace proximate the aircraft, and receiver 74 is configured to receive, via antenna elements 72, return signals (reflectivity values) if a target 86 is present to scatter energy back to the receiver. In one example, target 86 may be another aircraft, and the reflectivity data may correspond to a portion of the signal reflected back to the radar by the surface of the other aircraft. In another example, target 86 may be, for example, a weather object, and the reflectivity data may correspond to a portion of the signal reflected back to the radar by liquids (e.g., rain) and/or frozen droplets (e.g., hail, sleet, and/or snow) residing in the weather object, such as a cloud or storm, or residing in areas proximate to the cloud or storm generating the liquids and/or frozen droplets. In some examples, radar controller 78 controls transmitter 76 and receiver 74 to send and receive signals 82, 84, respectively, via antenna elements 72 based on aircraft data (e.g., position, heading, roll, yaw, pitch, and the like) received from aircraft systems 80.

In some examples, radar controller 78 digitizes the return signals 84 and sends the digitized signals to processor 62. Processor 62 may receive the radar returns data from radar controller 78 and store the radar return data in memory 66. Processor 62 may be able to update the buffer with radar reflectivity data from new scans. Processor 62 may then extract reflectivity data from the buffer to generate the desired radar information, e.g., object detection and/or tracking, weather information, and/or navigation information, without having to make and wait for view-specific antenna scans.

Processor 62 is configured to detect objects, track objects, generate weather information, and/or aid in navigation of the aircraft based on the radar reflectivity data (also referred to herein as radar return data) provided by radar controller 78, receiver 74, and/or antenna elements 72. For example, processor 62 may identify the type of detected objects proximate the aircraft, such as another aircraft, rain/moisture, land formations, and/or turbulence based on the radar reflectivity data and a corresponding algorithmic interpretation of the reflectivity values.

In some examples, radar 12 and/or base 14 (FIG. 1) may include the components of radar system 64. For example, radar 12 may include antenna elements 72 (e.g., as a component of antenna 13 or RF module 15 from FIG. 1), and base 14 may include receiver 74, transmitter 76, and radar controller 78. In other examples, other components or parts of an aircraft or other vehicle may include one or more of the components of radar system 64. Additionally, or alternatively, one or more components of vehicle system 60 and/or aircraft systems 80 may be included in one of a radar or a base.

User interface 68 is configured to present radar information to a user, who may be a pilot of the aircraft, another flight crew member, or may be located remotely from the aircraft, such as at a ground control station. User interface 68 includes display device 70, which can be, for example, one or more of a liquid crystal display (LCD) or a light emitting diode (LED) display configured to present visual information to the user. Display device 70 may be any suitable device, such as, for example, one or more of a tablet computing device, an electronic flight bag (EFB), a primary flight display (PFD), a multifunction display (MFD), a navigation display, or any other suitable display. Display device 70 may be a head-up display, a head-down display, or a head-mounted display.

In addition, in some examples, user interface 68 includes a speaker configured to deliver audible information, a sensory device configured to deliver information via a somatosensory alert, or any combination thereof. User interface 68 may be configured to receive input from a user. For example, user interface 68 may include one or more of a keypad, buttons, a peripheral pointing device, or other input mechanism that allows the user to provide input. The buttons may be dedicated to performing a certain function, e.g., receiving user input indicative of a specific type of input, or the buttons and the keypad may be soft keys that change in function depending upon the section of a display currently viewed by the user. In some examples, display device 70 of user interface 68 may be a touch screen display configured to receive the input from the user.

Figure 8:
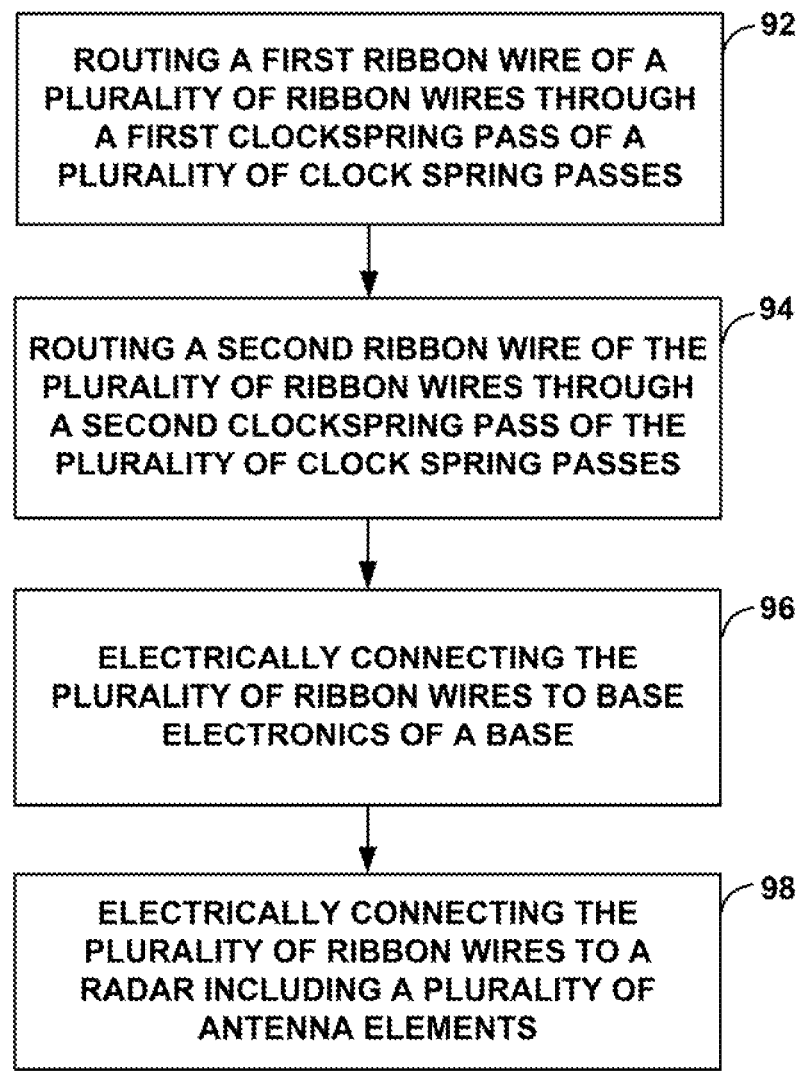
FIG. 8 is a flow diagram illustrating an example technique for electrically connecting a radar to electronics of a base.

FIG. 8 is a flow diagram illustrating an example technique for electrically connecting a radar to electronics of a base. The technique of FIG. 8 will be described with respect to radar system 10 of FIGS. 1-3. However, in other examples, the technique of FIG. 8 may be used to electrically connect a radar to electronics of a base for systems other than those of FIGS. 1-3.

The technique of FIG. 8 includes routing first ribbon wire 20A of plurality of ribbon wires 20 through first clockspring pass 18A of plurality of clockspring passes 18 (92). As described above, in some examples, first ribbon wire 20A may be wrapped around an internal structure of first clockspring pass 18A. In some examples, first ribbon wire 18A may be routed through first clockspring pass 18A multiple times, e.g., coiled around the internal structure 34A of first clockspring pass 18A multiple times.

Additionally, or alternatively, a stack of two or more ribbon wires of plurality of ribbon wires 20 may be routed through a clockspring pass of plurality of clockspring passes 18. In some such examples, the technique of FIG. 8 may include routing an additional ribbon wire of plurality of ribbon wires 20 through first clockspring pass 18A. Although described with respect to routing an additional ribbon wire of plurality of ribbon wires 20 through first clockspring pass 18A, any number of additional ribbon wires of plurality of ribbon wires 20 may be routed through any clockspring pass of plurality of clockspring passes 18. In examples in which one or more additional ribbon wires 20 are routed through a clockspring pass of plurality of clockspring passes 18, first ribbon wire 20A may be stacked with the one or more additional ribbon wires prior to being routed through the clockspring pass. In this way, the stack of ribbon wires 20 routed through the clockspring pass may include alternating layers of the different ribbon wires 20 to facilitate proper tightening and loosening of ribbon wires 20 around each clockspring pass of the plurality of clockspring passes 18.

In some examples, routing additional ribbon wires 20 through plurality of clockspring passes 18 may help reduce the overall footprint (or volume) occupied by gimbal assembly 16 and/or clockspring passes 18 while still allowing for a plurality of electrical connections between base 14 and radar 12 to be routed through plurality of clockspring passes 18. In this way, the combination of ribbon wires 20 and clockspring passes 18 may allow radar system 10 to be relatively compact and/or prevent ribbon wires 20 from twisting, bending, turning, or the like during normal operation of radar system 10.

In examples in which an additional ribbon wire of plurality of ribbon wires 20 is routed through first clockspring pass 18A, the technique of FIG. 8 may further include connecting first ribbon wire 20A and the additional ribbon wire of plurality of ribbon wires 20 routed through first clockspring pass 18A to a component of at least one of the base electronics or the plurality of antenna elements. As an example, the technique of FIG. 8 including routing an additional ribbon wire of plurality of ribbon wires 20 through first clockspring pass 18A may include electrically connecting first ribbon wire 20A and the additional ribbon wire to the same component of the at least one of the base electronics or the plurality of antenna elements.

The technique of FIG. 8 also includes routing second ribbon wire 20B of plurality of ribbon wires 20 through second clockspring pass 18B of plurality of clockspring passes 18 (94). Routing second ribbon wire 20B through second clockspring pass 18B (94) may be the same or substantially the same as routing first ribbon wire 20A through first clockspring pass 18A (92). In some examples, one of first ribbon wire 20A or second ribbon wire 20B is wrapped around an internal structure 34 of a respective clockspring pass 18A or 18B a different number of times than the other of first ribbon wire 20A or second ribbon wire 20B.

Plurality of clockspring passes 18 are configured to permit first and second ribbon wires 20A and 20B to tighten and loosen as radar 12 rotates relative to base 14. For example, plurality of clockspring passes 18 may allow radar 12 to rotate about a first axis, e.g., about the x-axis of FIG. 1, in a range of about 180 degrees, about 160 degrees, or about 120 degrees without ribbon wires 20 repetitively twisting, bending, turning, or moving. However, other ranges of motion may also be used in other examples.

In some examples, the technique of FIG. 8 includes nesting first clockspring pass 18A with second clockspring pass 18B. In some examples, nesting first clockspring pass 18A with second clockspring pass 18B may include mating an indentation of one of first clockspring pass 18A or second clockspring pass 18B with a protrusion of the other of first clockspring pass 18A or second clockspring pass 18B. In other examples, first and second clockspring passes 18A and 18B may be nested in another way. In some examples, first clockspring pass 18A and second clockspring pass 18B are nested prior to routing first ribbon wire 20A and/or second ribbon wire 20B through clockspring pass 18A and clockspring pass 18B, respectively. In other examples, first clockspring pass 18A and second clockspring pass 18B may be nested after routing first ribbon wire 20A and/or second ribbon wire 20B through the respective clockspring pass 18A, 18B. Nesting first clockspring pass 18A with second clockspring pass 18B may prevent clockspring passes 18A or 18B from rotating relative to each other, which in turn may enable plurality of clockspring passes 18 to function properly.

In accordance with the technique of FIG. 8, electrically connecting plurality of ribbon wires 20 to base electronics of base 14 (96) and electrically connecting plurality of ribbon wires 20 to radar 12 including a plurality of antenna elements (98). Electrically connecting plurality of ribbon wires 20 to base electronics of base 14 (96) and electrically connecting plurality of ribbon wires 20 to radar 12 (98) may include any electrical connections to enable operation of radar 12 to transmit and/or receive radar signals via antenna elements of radar 12.

In some examples, the technique of FIG. 8 includes mechanically connecting radar 12 to base 14, which may include mechanically connecting gimbal assembly 16 to radar 12 and to base 14. Mechanically connecting gimbal assembly 16 to radar 12 and to base 14 may include mechanically connecting first end 28 and shaft end 30 to radar 12 and base 14, respectively. Radar 12 may be mechanically connected to base 14 by any applicable connection or attachment means.

In some examples, the technique of FIG. 8 optionally includes routing additional ribbon wires of plurality of ribbon wires 20 through an additional clockspring pass of the plurality of clockspring passes 18. For example, a third ribbon wire 20C of plurality of ribbon wires 20 may be routed through a third clockspring pass 18C of plurality of clockspring passes 18. The technique of FIG. 8 may include routing any number of ribbon wires of plurality of ribbon wires 20 through any number of clockspring passes of plurality of clockspring passes 18 in order to fit particular needs.

In addition, in some examples, the technique of FIG. 8 may include routing at least some of the plurality of ribbon wires 20 (e.g., some or all) through pendulum member 22 and/or a second plurality of clockspring passes 19 used in addition to or instead of pendulum member 22. Pendulum member 22 and/or second plurality of clockspring passes 19, in some examples, may keep ribbon wires 20 better organized (e.g., relative to a "flying cable" type wiring arrangement) as they are routed from base 14 to clockspring passes 18 and/or from clockspring passes 18 to radar 12. Plurality of clockspring passes 18 are configured to facilitate tightening and loosening of ribbon wires 20 as radar 20 rotates about a first axis (e.g., about the x-axis in the example shown in FIG. 1), while pendulum member 22 and/or second plurality of clockspring passes 19 may be configured to facilitate movement of ribbon wires 20 in a different direction or about a different axis, respectively, than clockspring passes 18. For example, pendulum member may facilitate movement in a back and forth manner about the y-axis (FIG. 1), and second plurality of clockspring passes 19 may configured such that ribbon wires 20 can tighten and loosen around the clockspring passes as radar 12 rotates relative to base 14 about the y-axis (FIG. 3). In some examples, radar 12 is configured to rotate about the second axis in a range of about 70 degrees, or in a range of about 60 degrees. In other examples, other ranges of motion may also be used. In some examples, radar system 10 including plurality of clockspring passes 18 and pendulum member 22 and/or second plurality of clockspring passes 19 may be configured to allow radar 12 to rotate about the x-axis and y-axis simultaneously.

In some examples, radar 12 is configured to rotate relative to base 14 about a third axis, e.g., about the z-axis of FIG. 1. Radar system 10 may include a plurality of clockspring passes (different than the plurality 18 shown in FIG. 1 and the plurality 19 shown in FIG. 3) to help facilitate movement of wires 20 as radar 12 rotates about the third axis relative to base 14. The plurality of clockspring passes may be the same or substantially the same as plurality of clockspring passes 18, but may be configured to permit ribbon wires 20 to tighten and loosen as radar 12 rotates about the third axis. In some such examples, the technique of FIG. 8 may further include routing first ribbon wire 20A through a first clockspring pass of a second (or third) plurality of clockspring passes and routing second ribbon wire 18B through a second clockspring pass of the second (or third) plurality of clockspring passes.

Various examples have been described. These and other examples are within the scope of the following claims.

What is claimed is:

1. A system comprising:
   a base comprising base electronics;
   a component comprising circuitry;
   a gimbal assembly mechanically connecting the component to the base, the gimbal assembly being configured to permit the component to rotate relative to the base;
   a plurality of ribbon wires electrically connecting the base electronics to the component; and
   a plurality of clockspring passes between the base and the component, wherein each ribbon wire of the plurality of ribbon wires is routed between the base and the component through a clockspring pass of the plurality of clockspring passes, each ribbon wire of the plurality of ribbon wires being coiled around a structure of a clockspring pass of the plurality of clockspring passes, wherein the ribbon wire is configured to tighten or loosen around the structure as the component rotates relative to the base.

2. The system of claim 1, wherein a length of each ribbon wire of the plurality of ribbon wires within the respective clockspring pass of the plurality of clockspring passes does not change as the component rotates relative to the base.

3. The system of claim 1, wherein the component has an initial rotational position relative to the base, wherein portions of the ribbon wires within the clockspring passes define loops having an initial transverse dimension when the component is in the initial rotational position, and wherein when the component rotates away from the initial rotational position in a first direction, the ribbon wires define loops having a smaller transverse dimension than the initial transverse dimension, and wherein when the component rotates away from the initial rotational position in a second direction opposite the first direction, the ribbon wires define loops having a larger transverse dimension than the initial transverse dimension.

4. The system of claim 1, wherein at least two ribbon wires of the plurality of ribbon wires are routed through the same clockspring pass of the plurality of clockspring passes.

5. The system of claim 4, wherein the plurality of ribbon wires forms a first stack of ribbon wires and the at least two ribbon wires of the plurality of ribbon wires routed through the same clockspring pass of the plurality of clockspring passes form a second stack having a fewer number of ribbon wires than the first stack, and wherein:
the first stack splits into at least the second stack and a third stack comprising one or more ribbon wires of the plurality of ribbon wires,
at least the second stack and the third stack are each routed through a respective clockspring pass of the plurality of clockspring passes; and
after being routed through the respective clockspring passes, at least the second stack and the third stack are re-stacked to form a fourth stack of ribbon wires.

6. The system of claim 1, wherein the plurality of clockspring passes comprises a first plurality of clockspring passes, and wherein the gimbal assembly is configured to permit the component to rotate relative to the base about a first axis and a second axis, the first plurality of clockspring passes being configured to permit the ribbon wires to tighten or loosen around the structure as the component rotates relative to the base about the first axis, the system further comprising:
a pendulum member configured to rotate about the second axis, wherein at least one ribbon wire of the plurality of ribbon wires are routed between the base and the component through the pendulum member; or
a second plurality of clockspring passes, at least one ribbon wire of the plurality of ribbon wires being routed between the base and the component through the second plurality of clockspring passes, the at least one ribbon wire being coiled around a structure of a clockspring pass of the second plurality of clockspring passes, wherein the at least one ribbon wire is configured to tighten or loosen around the structure of the clockspring pass of the second plurality of clockspring passes as the component rotates relative to the base about the second axis.

7. The system of claim 6, wherein the gimbal assembly is further configured to permit the component to rotate relative to the base about a third axis, the system further comprising a third plurality of clockspring passes, at least one ribbon wire of the plurality of ribbon wires being routed between the base and the component through the third plurality of clockspring passes.

8. The system of claim 1, wherein the plurality of clockspring passes are stacked together.

9. The system of claim 1, wherein the component comprises a radar comprising an antenna element.

10. A system comprising:
a base comprising base electronics;
a component comprising circuitry;
a gimbal assembly mechanically connecting the component to the base, the gimbal assembly being configured to permit the component to rotate relative to the base about an axis, wherein the component has an initial rotational position relative to the base;
a plurality of ribbon wires electrically connecting the base electronics to the component; and
a plurality of clockspring passes between the base and the component, each ribbon wire of the plurality of ribbon wires defining a coil within a clockspring pass of the plurality of clockspring passes, wherein when the component rotates away from the initial rotational position in a first direction, the coils defined by ribbon wires tighten within the respective clockspring pass, and when the component rotates away from the initial rotational position in a second direction different than the first direction, the coils defined by ribbon wires loosen within the respective clockspring pass.

11. The system of claim 10, wherein portions of the ribbon wires within the clockspring passes define loops having an initial transverse dimension when the component is in the initial rotational position, and wherein when the component rotates away from the initial rotational position in the first direction, the ribbon wires define loops having a smaller transverse dimension than the initial transverse dimension, and wherein when the component rotates away from the initial rotational position in the second direction, the ribbon wires define loops having a larger transverse dimension than the initial transverse dimension.

12. The system of claim 10, wherein at least two ribbon wires of the plurality of ribbon wires are routed through the same clockspring pass of the plurality of clockspring passes.

13. The system of claim 10, wherein the component comprises a radar comprising a plurality of antenna elements.

14. A method comprising:
wrapping a first ribbon wire of a plurality of ribbon wires around a first structure of a first clockspring pass of a plurality of clockspring passes;
wrapping a second ribbon wire of the plurality of ribbon wires around a second structure of a second clockspring pass of the plurality of clockspring passes;
electrically connecting the plurality of ribbon wires to base electronics of a base; and
electrically connecting the plurality of ribbon wires to a component comprising circuitry, wherein the plurality of ribbon wires electrically connect the base electronics to the component, and wherein a gimbal assembly mechanically connects the component to the base, the gimbal assembly being configured to permit the component to rotate relative to the base,
wherein the plurality of clockspring passes is between the base and the component and each ribbon wire of the plurality of ribbon wires is routed between the base and the component through a clockspring pass of the plurality of clockspring passes, wherein the first and second ribbon wires are configured to tighten or loosen around the first structure or the second structure, respectively, as the component rotates relative to the base.

15. The method of claim 14, further comprising mechanically connecting the component to the base, wherein mechanically connecting the component to the base comprises mechanically connecting the gimbal assembly to the component and to the base.

16. The method of claim 14, wherein the plurality of clockspring passes comprises a first plurality of clockspring passes, and wherein the component is configured to rotate relative to the base about a first axis and a second axis, the first plurality of clockspring passes being configured to permit the first and second ribbon wires to tighten or loosen around the first structure or the second structure, respectively, as the component rotates relative to the base about the first axis, the method further comprising:
routing the first ribbon wire between the base and the component through a pendulum member, wherein the pendulum member is configured to rotate about the second axis; or
wrapping the first ribbon wire around a third structure of a third clockspring pass of a second plurality of clockspring passes, wherein the first ribbon wire is configured to tighten or loosen around the third structure of the third clockspring pass as the component rotates relative to the base about the second axis.

17. The method of claim 16, wherein the gimbal assembly is further configured to permit the component to rotate relative to the base about a third axis, the method further comprising:
wrapping the first ribbon wire around a fourth structure of a fourth clockspring pass of a third plurality of clockspring passes, wherein the first ribbon wire is configured to tighten or loosen around the fourth structure of the fourth clockspring pass as the component rotates relative to the base about the third axis.

18. The method of claim 14, further comprising wrapping a third ribbon wire of the plurality of ribbon wires around the first structure of the first clockspring pass.

19. The method of claim 18, wherein wrapping the first and third ribbon wires around the first structure comprises:
stacking the first and third ribbon wires; and
wrapping the stacked first and third ribbon wires around the first structure of the first clockspring pass.

20. The method of claim 18, further comprising:
forming a first stack of ribbon wires comprising the plurality of ribbon wires;
splitting the first stack into at least a second stack and a third stack, the second and third stacks each including a fewer number of ribbon wires than the first stack, wherein the second stack comprises at least the first ribbon wire and the third ribbon wire, and the third stack comprises at least the second ribbon wire;
wrapping the second stack around the first structure of the first clockspring pass;
wrapping the third stack around the second structure of the second clockspring pass; and
after wrapping the second and third stacks around the first and second structures, respectively, re-stacking the second and third stacks of ribbon wires to define a fourth stack of ribbon wires.

* * * * *